United States Patent [19]

Magnussen, Jr. et al.

[11] Patent Number: 4,671,123

[45] Date of Patent: Jun. 9, 1987

[54] METHODS AND APPARATUS FOR PIPETTING AND/OR TITRATING LIQUIDS USING A HAND HELD SELF-CONTAINED AUTOMATED PIPETTE

[75] Inventors: Haakon T. Magnussen, Jr., Pinole; Gary L. Smith, Walnut Creek; Stephen J. Ruskewicz, Kensington; Anthony K. Wingo, Oakland, all of Calif.

[73] Assignee: Rainin Instrument Co., Inc., Emeryville, Calif.

[21] Appl. No.: 580,587

[22] Filed: Feb. 16, 1984

[51] Int. Cl.[4] .............................................. G01N 1/14

[52] U.S. Cl. .............................. 73/864.16; 73/864.18; 73/864.14; 436/51; 436/179; 436/180

[58] Field of Search ........... 73/864.16, 864.18, 864.11, 73/864.14, 864.13, 864.01; 436/180, 179, 51

[56] References Cited

U.S. PATENT DOCUMENTS

| | | | |
|---|---|---|---|
| 3,142,719 | 7/1964 | Farr | 73/864.16 X |
| 3,143,393 | 8/1964 | de Seguin des Hons | 73/864.11 X |
| 3,197,285 | 7/1965 | Rosen | 73/864.18 X |
| 3,769,178 | 10/1973 | Rothermel, Jr. | 436/51 X |
| 3,915,651 | 10/1975 | Nishi | 73/864.16 |
| 3,991,616 | 11/1976 | Stahli | 73/864.16 X |
| 4,096,750 | 6/1978 | Sturm | 73/864.18 |
| 4,154,108 | 5/1979 | Völlinger et al. | 73/864.13 |
| 4,345,483 | 8/1982 | Paletta et al. | 73/864.16 |
| 4,369,665 | 1/1983 | Citrin | 73/864.18 |
| 4,399,711 | 8/1983 | Klein | 73/864.16 |
| 4,475,666 | 10/1984 | Bilbrey et al. | 73/864.16 X |
| 4,517,850 | 5/1985 | Wiseman et al. | 73/864.01 X |
| 4,519,258 | 5/1985 | Jakubowicz | 73/864.16 |
| 4,563,907 | 1/1986 | Johnson, Jr. et al. | 73/864.16 |

FOREIGN PATENT DOCUMENTS

| | | | |
|---|---|---|---|
| 2736551 | 3/1978 | Fed. Rep. of Germany | 73/864.18 |
| 2651333 | 5/1978 | Fed. Rep. of Germany | 73/864.18 |
| 2071052 | 9/1971 | France | 73/864.16 |
| 2315319 | 1/1977 | France | 73/864.11 |

*Primary Examiner*—Stewart J. Levy
*Assistant Examiner*—Tom Noland
*Attorney, Agent, or Firm*—Townsend and Townsend

[57] ABSTRACT

A hand held self-contained automated pipette for portable operation having an electrically operated digital linear actuator. The actuator preferably includes a stepper motor driving a rotor. A threaded screw is coaxially positioned within the rotor and is connected to an actuator shaft having elongate grooves slidable in a guide for preventing shaft rotation so that precise linear motion is imparted to the shaft. A pipetting displacement assembly having one of various sizes is removably attached for actuation by a common actuator including programmed movement of a displacing piston in a displacement cylinder to optimize air interface volume, neutralize variations in vacuum pipette effects, and provide an accommodated stroke and readout for improved accuracy while pipetting and/or titrating different ranges of volumes. A control circuit is provided so that the back EMF of the stepper motor coils is recirculated when power is duty-cycled off for power conservation. Conversely, recirculation is switched off when power is duty-cycled on for minimizing losses. Recirculation is switched off when coils are commutated which produces a rapid magnetic field collapse for assuring high torque. Upon calibration the piston undertakes immediate excursion to an end of travel limit and after motor slippage is retracted to a home position. This home position is chosen for optimum preservation of an air interface volume between drawn liquid and the piston tailored with particularity to the displacement assembly being used. Multiple precision modes including pipetting, multiple dispensing, titration, and dilution, are provided. Other features are also disclosed.

24 Claims, 26 Drawing Figures

METHODS AND APPARATUS FOR PIPETTING AND/OR TITRATING LIQUIDS USING A HAND HELD SELF-CONTAINED AUTOMATED PIPETTE

BACKGROUND OF THE INVENTION

This invention relates to pipettes and titrators and, more particularly, to pipettes having an electrically operated linear actuator. Specifically, the invention is directed to a self-contained automated pipette for portable operation having an electronically controlled digital linear actuator, which accommodates removably attachable pipetting displacement assemblies of various sizes for providing improved precision and accuracy.

Mechanically operated pipettes are known. These pipettes have spring activated stops for controlling displacement piston movement.

Mechanically operated pipettes rely on repeated operator precision because they employ different spring constants for providing tactile sensing of proper displacement piston stroke. Unfortunately, such soft stops are not precise and are often missed due to operator inexperience, fatigue, or inattention. Imprecision in pipetting and/or titrating results. Advantageously, however, mechanically operated pipettes are self-contained, that is, stand alone instruments, and are generally portable.

Electrically operated linear actuators for controlling displacement piston movement in a pipette are known. See Nishi U.S. Pat. No. 3,915,651 which discloses an electronic preset indexer connected to a stepping motor through a cord attachment. The stepping motor is energized by an essentially infinite source of power for driving a screw slide assembly actuated displacement rod.

In order to effectively use a pipette having an electrically operated linear actuator in a laboratory, a portable instrument approaching the size, shape, and weight of known mechanically operated pipettes is desirable. The size and shape of the pipette is critical to portability. If the pipette is overly long, the instrument is unwieldy. Heretofore, electrically operated pipettes have been configured so that a stepper motor is typically attached directly to and adds directly to the length of the linear actuator shaft as disclosed in Nishi U.S. Pat. No. 3,915,651. Consequently, electrically operated pipettes have not been characterized by portable operation in the past.

A further consideration of portability for pipettes is weight. However, considerable energy is required by known pipettes having an electrically operated linear actuator. For example, in order to hold stepper motors in position, continuous power is typically needed. Heretofore, electrically operated pipettes, such as disclosed in Nishi U.S. Pat. No. 3,915,651, have required such significant amounts of power that power has been supplied by a circuit which is separate from the other components of the instrument. Combination of the circuit and the remainder of the components of known electrically operated pipettes into a self-contained instrument would result in a bulky instrument which would not be portable in any practical sense. Nor have the power demands of known stepper motor circuits heretofore enabled an electrically operated pipette to be battery powered. Further, known stepper motor circuits include loss of torque during high speed movement, a characteristic that can cause loss of step count and consequent imprecise linear actuator movement.

A further difficulty with the known pipette technology is that precise digital movement has not been applied to alleviate inaccuracies inherent in pipetting and/or titrating with a pipette having an electrically operated linear actuator, such as disclosed in Nishi U.S Pat. No. 3,915,651. For example, inaccuracies resulting from surface tension, atmospheric pressure, and expansion and contraction of the air typically found in pipettes have heretofore not been addressed. Furthermore, the configuration of the pipetting displacement assembly provides accuracy only over a limited range, which means that inaccuracy has resulted when the pipette is operated beyond the range.

SUMMARY OF THE INVENTION

The present invention provides a hand held self-contained automated pipette having an electronically controlled digital linear actuator with reduced power requirements for precisely pipetting and/or titrating liquids. The pipette in accordance with the invention has a size, weight, and shape so that the instrument is portable for facilitating extended use during pipetting and/or titrating while being held by an operator. The pipette in accordance with the invention also accommodates different interchangeable pipetting displacement assemblies for different ranges so that accuracy is improved.

The invention provides a hand held self-contained pipette for portable operation having a digital linear actuator energized by a control circuit for precisely controlling the actuator. In accordance with the invention, a pipette is provided, comprising: a pipette drive means, including a motor having a stator and a rotor, an integral control circuit for supplying power to the motor, and a shaft having a threaded connection through the rotor to move in precise lengthwise increments in response to rotation of the rotor; and a displacement assembly, including a displacing piston, means for communicating linear translation of the shaft to the piston, and a displacement chamber having a first end in communication with the piston and having a second end with an aperture for receiving liquid to be pipetted.

Preferably, the motor is a stepper motor supplied with pulsed current, and interior of the rotor of the stepper motor is a threaded screw. The screw connects to a shaft which includes grooves slidable in a guide for preventing shaft rotation. Rotation of the rotor causes precise digital linear motion to be imparted to the shaft. The stepper motor does not add directly to the length of the pipette.

Preferably, the pipetting displacement assembly is removably attachable and is available in various sizes. Movement of the digital linear actuator is programmed in order to optimize air interface volume or buffer, neutralize variations in vacuum pipette effects, and provide an accommodated stroke and readout for pipetting full-scale ranges typically of 10, 25, 100, 250, and 1,000 microliters all actuated by a common linear actuator. Preferably, the digital linear actuator is programmed by an encoder means corresponding to the full-scale volume range of the displacement assembly, which is connected to the control circuit and initializes the pipette drive means. Different pipetting displacement assemblies for different full-scale volume ranges provide improved accuracy.

A control circuit means for controlling the stepper motor is integrated into the pipette. In accordance with the invention, a pipette control circuit means is provided, comprising: first and second power supply terminals; a control circuit having a plurality of switch control signal output terminals at which the control circuit provides control signals having a predetermined frequency and phase relationship to each other; and a plurality of actuator shaft drive elements connected in parallel between the power supply terminals, each drive element including a coil and a diode connected in parallel with each other and in series with a recirculation control switch means responsive to a respective control signal so that when the switch means is opened, current flows between the power supply terminals, and when the switch means is closed, back EMF in the coil induces a current to recirculate through the diode and the coil, thereby respectively disabling and enabling current recirculation. Preferably, the pipette control circuit means further comprises a second switch means having first and second transfer terminals connected in series between the diodes and one of the supply terminals and having a control terminal, wherein the control circuit supplies signals to the switch control terminal to which the second switch means responds by opening and closing for respectively opening and closing the recirculation control switch means.

Preferably, the back EMF of the stepper motor coils is recirculated during off periods of the power duty cycle for providing power conservation. Conversely, recirculation is switched off during on periods of the power duty cycle for minimizing losses. Recirculation is also switched off when the stepper motor coils are commutated, which produces a rapid magnetic field collapse for assuring high torque during movement.

Static friction is employed in lieu of holding torque for maintaining the position of the stepper motor. Consequently, the power demand of the stepper motor circuit is substantially reduced. As a result, the pipette can be battery powered for an extended period of time.

In accordance with the invention, a method for calibrating a motor driven linear actuator for a pipette having a pipetting displacement assembly including a displacing piston is provided. The calibrating method comprises the steps of: supplying power to advance the motor to drive the displacing piston to a travel limit and continuing to supply power as the motor slips; and then reversing the direction of the motor to cause the piston to move a predetermined distance away from the travel limit to a home position maintaining a predetermined air volume.

Preferably, upon being initialized with power, the linear actuator undertakes immediate excursion to a travel limit, the travel limit typically being defined by a displacing piston engaging the end of a displacement chamber included in a removably attachable pipetting displacement assembly. After a complete cycle with intended motor slippage at the travel limit, the displacing piston is retracted to a home position. This home position is chosen for preservation of an optimum air buffer between drawn liquid and the displacing piston tailored with particularity to the removably attachable pipetting displacement assembly being used.

Multiple precision modes of operation of the pipette in accordance with the invention are provided for the convenience of the operator. These modes include pipetting, multiple dispensing, titrating, and diluting.

In accordance with the invention, a method is provided for pipetting with a pipette having an electrically driven linear actuator and, connected to the linear actuator, a pipetting displacement assembly including a displacing piston movable within one end of a displacement cylinder having a displacement chamber and having another end with an aperture communicable with liquid to be pipetted. The pipetting method comprises the steps of: retracting the displacing piston a predetermined first distance in the displacement cylinder to compensate for air pressure and surface tension effects to cause liquid to begin to move into the displacement chamber; and retracting the piston a second distance to draw in the volume to be pipetted, whereby the total volume of pipetted liquid taken in is less than the total displacement of the piston. The pipetting method preferably comprises the additional steps of: extending the piston into the cylinder a predetermined third distance to compensate for air pressure and surface tension effects to cause liquid to move towards discharge; and extending the piston a fourth distance to dispense the volume of liquid.

In accordance with the invention, a method is also provided for multiple dispensing with a pipette having an electrically driven linear actuator and, connected to the linear actuator, a pipetting displacement assembly including a displacing piston movable within one end of a displacement cylinder having a displacement chamber and having another end with an aperture communicable with liquid to be pipetted. The multiple dispensing method comprises the steps of: retracting the displacing piston a predetermined first distance in the displacement cylinder to compensate for air pressure and surface tension effects to cause liquid to begin to move into the displacement chamber; retracting the piston a second distance to draw a volume of liquid in excess of a first volume of liquid into the displacement chamber; extending the piston into the cylinder a third distance to cause the excess volume of liquid to be dispensed so that the first volume of liquid remains in the displacement chamber; and repetitively extending the piston a fourth distance to dispense a second volume of liquid each repetition until a modulo remnant of liquid remains. The multiple dispensing method preferably comprises the additional step of extending the piston a fifth distance to dispense the modulo remnant.

In accordance with the invention, a method is further provided for titrating with a pipette having an electrically driven linear actuator and, connected to the linear actuator, a pipetting displacement assembly including a displacing piston movable within one end of a displacement cylinder having a displacement chamber and having another end with an aperture communicable with liquid to be pipetted. The titrating method comprises the steps of: retracting the displacing piston a predetermined first distance in the displacement cylinder to compensate for air pressure and surface tension effects to cause liquid to begin to move into the displacement chamber; retracting the piston a second distance to draw a volume of liquid in excess of a first volume of liquid into the displacement chamber; extending the piston into the cylinder a third distance to cause the excess volume of liquid to be dispensed so that the first volume of liquid remains in the displacement chamber; extending the piston into the cylinder a fourth distance to dispense a second volume of liquid; and incrementally extending the piston into the cylinder thereafter to successively dispense incremental volumes of liquid.

In accordance with the invention, a method is additionally provided for diluting with a pipette having an electrically driven linear actuator and, connected to the linear actuator, a pipetting displacement assembly including a displacing piston movable within one end of a displacement cylinder having a displacement chamber and having another end with an aperture communicable with liquid to be pipetted. The diluting method comprises the steps of: retracting the displacing piston a predetermined first distance in the displacement cylinder to compensate for air pressure and surface tension effects to cause liquid to begin to move into the displacement chamber; retracting the piston a second distance to draw a first volume of liquid into the displacement chamber; retracting the piston a predetermined third distance to create an air buffer in the displacement chamber; retracting the piston a predetermined fourth distance to compensate for air pressure and surface tension effects to cause liquid to begin to move into the displacement chamber; retracting the piston a fifth distance to draw a second volume of liquid into the displacement chamber; and extending the piston into the cylinder a sixth distance to dispense the second volume of liquid, air buffer, and first volume of liquid.

In using known mechanically operated pipettes, factors, such as inaccurately homing the displacing piston and varying rates of liquid intake and discharge, introduce inconsistencies in pipetted and dispensed volumes of liquid. In contrast, the operation of the pipette in accordance with the invention is highly reproducible.

An advantage of the pipette in accordance with the invention is that all of the operator initiated movements of the pipette appear to be conventional. Thus, the substitution of the pipette in accordance with the invention for known mechanically operated counterparts can be easily implemented without the substantial retraining of personnel. This retraining can be avoided even though the pipette has a relatively complex programmed movement.

Unlike known automated pipettes having electrically operated linear actuators, the length of the pipette in accordance with the invention is not appreciably longer than that of known mechanically operated pipettes. Furthermore, the pipette in accordance with the invention is self-contained with the control circuit for the stepper motor integrated with the other components of the pipette; yet the pipette is not bulky. A pipette results which is able to be held in the hand and is portable.

BRIEF DESCRIPTION OF THE DRAWINGS

The above and other features of the invention and the concomitant advantages will be better understood and appreciated by those skilled in the art in view of the description of the preferred embodiments given below in conjunction with the accompanying drawings. In the drawings.

DETAILED DESCRIPTION OF THE PREFERRED EMBODIMENTS

Figure 1A:
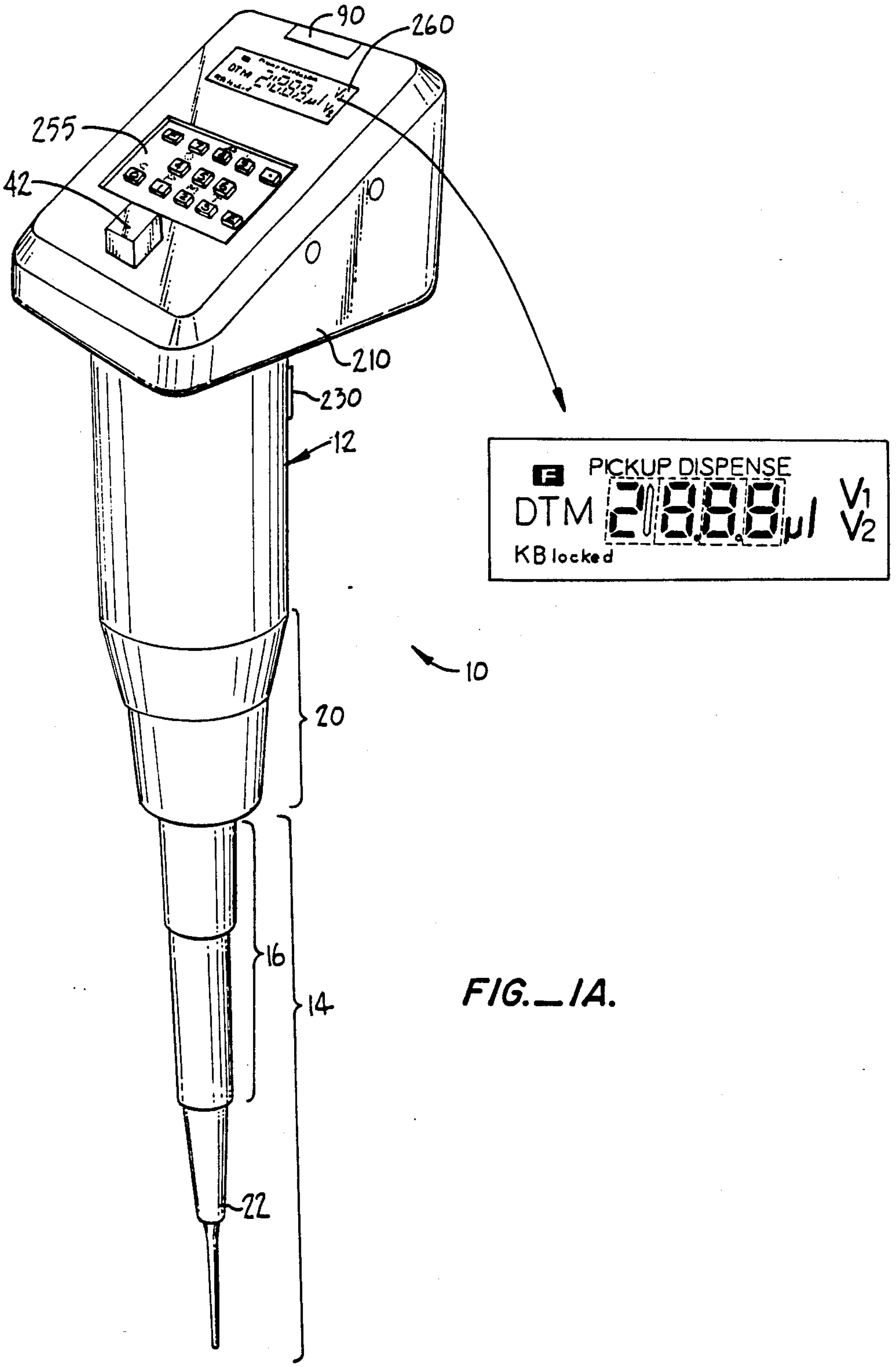
FIG. 1A is a perspective view of the pipette including an electrically operated digital linear actuator and removable pipetting displacement assembly in accordance with an embodiment of the invention, a display being shown in an enlarged section of the figure.
Figure 1B:
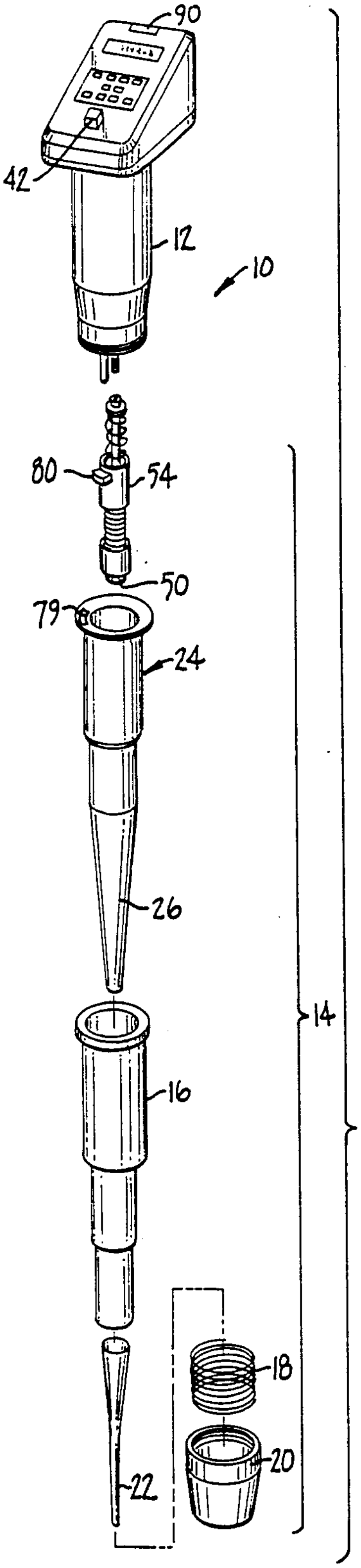
FIG. 1B is a perspective view of the pipette shown in FIG. 1A, the pipetting displacement assembly being shown in exploded form.

An assembled hand held self-contained automated electrically operated pipette 10 in accordance with an embodiment of the invention is shown in FIG. 1A. In FIG. 1B, the pipette 10 is shown separated into a digital linear actuator drive module 12 and a pipetting displacement assembly 14.

Figure 2:
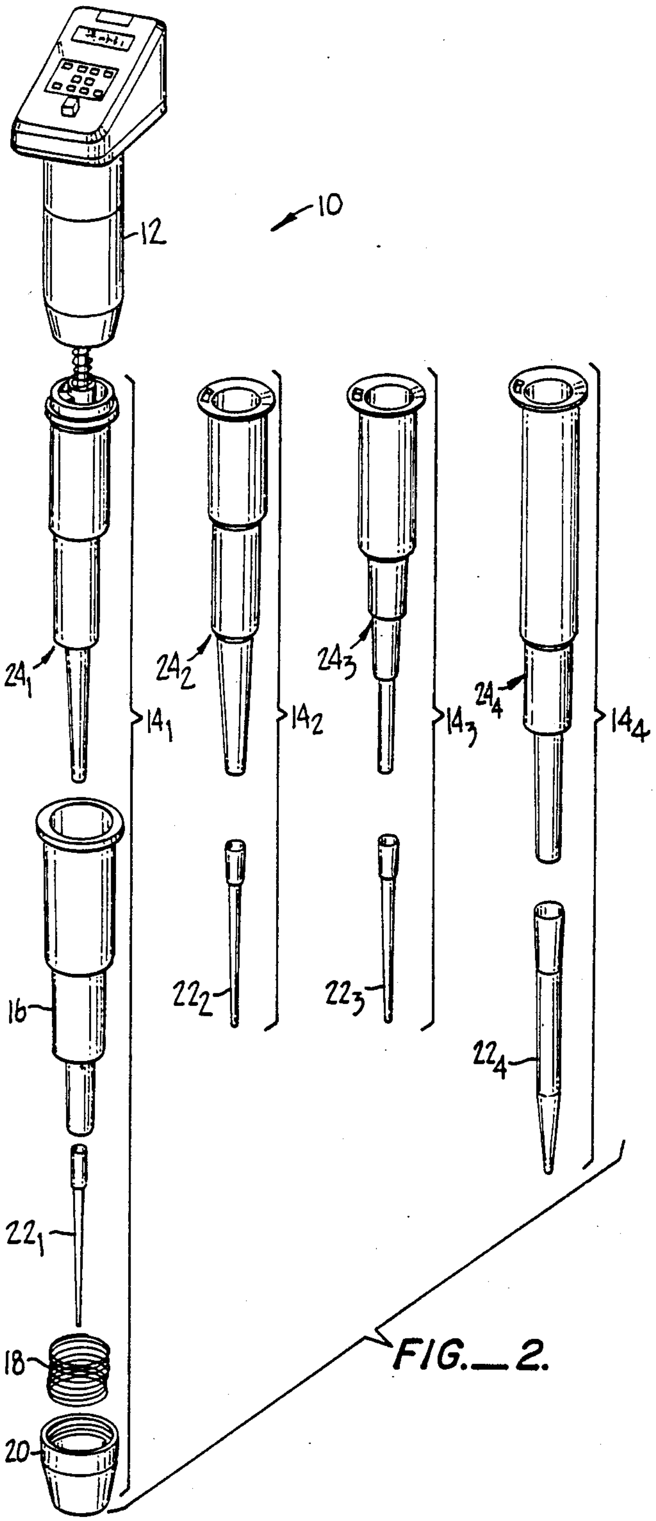
FIG. 2 shows a single digital linear actuator with various sizes of pipetting displacement assemblies.

One of various interchangeable displacement assemblies 14 shown in FIG. 2 removably attachable to the drive module 12 can be used while pipetting and/or titrating different ranges of volumes for improved accuracy. According to this aspect of the invention, the displacement assembly 14 has a construction which locks a displacing piston, displacement cylinder, sleeve, and tip in an assembly. This assembly is in turn mounted to the drive module 12 by means of a retainer ring. As a result, the pipette 10 has a common drive module 12 which can be used for any one of many pipetting and/or titrating ranges.

Figure 1D:
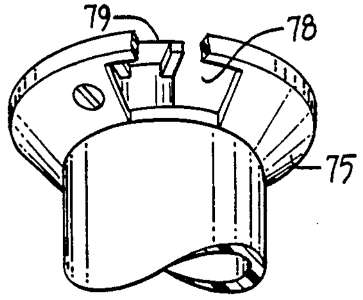
FIGS. 1D–1G are cutaway views of details of the pipetting displacement assembly included in the pipette shown in FIG. 1A.
Figure 1C:
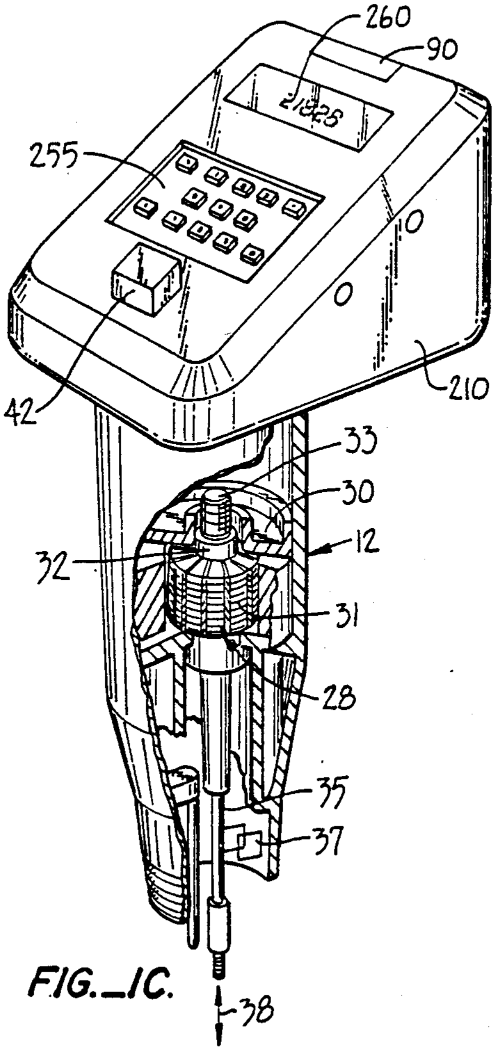
FIG. 1C is a cutaway section of the digital linear actuator included in the pipette shown in FIG. 1A.
Figure 1F:
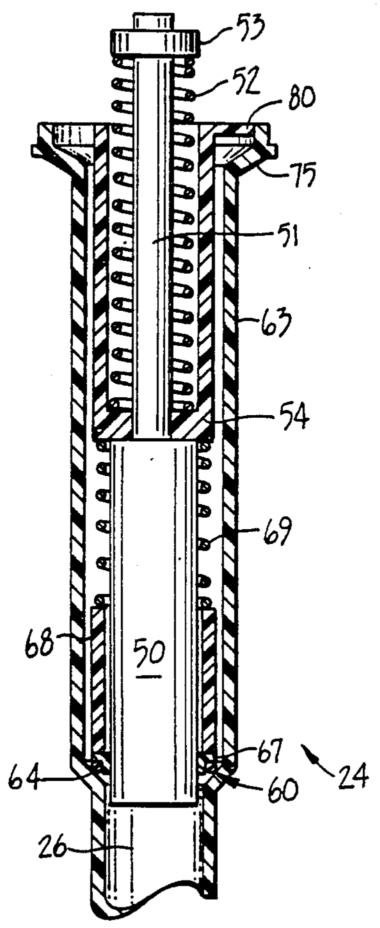

Considered in more detail, the displacement assembly 14 includes a displacement cylinder 24 and a displacing piston 50 as shown in FIG. 1F. The piston 50 is held by a spring housing 63 formed in a first end of the cylinder 24. The piston 50 and a connected piston rod 51, both preferably constructed from chrome-plated stainless steel, are biased upwardly by a compressed coil spring 52 between a ring 53 and a casing 54. This prevents backlash of the piston 50 and biases the piston rod 51 against the linear actuator included in the drive module 12 (FIG. 1C). This also facilitates disconnection of the displacement assembly 14 from the drive module 12.

Figure 1G:
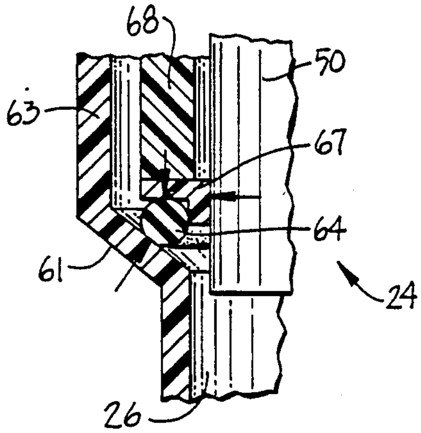

The piston 50 slides past an O-ring seal assembly 60 disposed in the cylinder 24 into one end of a displacement chamber 26 at the second end of the cylinder. A compressed coil spring 69 presses a sleeve 68 and hence a right angle collar 67 down onto an O-ring 64. Three boundaries, indicated by arrows shown in FIG. 1G, assure that the seal around the piston 50 is airtight. The first boundary is between the collar 67 and the O-ring 64. The second boundary is between the O-ring 64 and a frustrum 61 which connects the wall of the displacement chamber 26 with the spring housing 63. The third boundary is between the collar 67 and the piston 50.

Figure 1E:
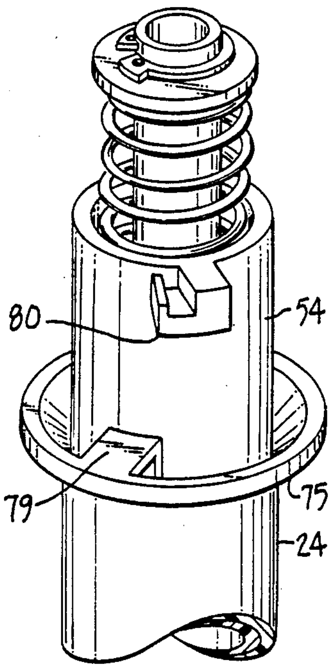

The top of the cylinder 24, indicated by the numeral 75, is flared as shown in FIGS. 1D, 1E, and 1F and includes a slot 78 and a downward facing first latching means 79. The casing 54 includes an upward facing second latching means 80 (FIG. 1E). The cylinder 24 and the piston 50 are assembled by registering the latching means 80 with the slot 78, pressing the casing 54 down into the cylinder, twisting the casing, and releasing the latching means 80 under the latching means 79. A sleeve 16 is slid onto the cylinder 24 and can be retained by a disposable pipetting tip 22 which slips onto the second end of the cylinder and is held by friction. A tip 22 having one of various full-scale volumes in the range from 10 microliters (μl) to 1,000 μl is attached to a corresponding displacement assembly 14 as shown in FIG. 2. As shown in FIGS. 1A and 1B, a retainer ring 20 secures the displacement assembly 14 to the drive module 12. The displacement assembly 14 remains unitary whether or not attached to the drive module 12.

An ejector means is preferably provided for detaching the tip 22. The ejector means includes an actuable ejector pushbutton 42 connected to an ejector shaft 44 as shown in FIG. 1I. The ejector shaft 44 is in turn connected to an ejector plate 46. Actuation of the ejector pushbutton 42 transfers through the ejector shaft 44, ejector plate 46, and sleeve 16 (FIG. 1A) to detach the tip 22. The sleeve 16, ejector plate 46, ejector shaft 44, and ejector pushbutton 42 are biased upwardly by a compressed coil spring 18 disposed between the retainer ring 20 and sleeve as shown in FIG. 1B.

The pipette 10 includes a digital linear actuator adapted for positively stepped precise linear actuation of the piston 50 included in the displacement assembly 14. The digital linear actuator is preferably driven by a stepper motor 28 as shown in FIG. 1C. The stepper motor 28 includes a rotor 31 with a threaded connection to a shaft. The shaft includes grooves which slide in a guide secured to the stepper motor 28 for preventing joint rotation of the rotor 31 and shaft, thereby imparting linear motion to the shaft. The shaft extends through the center of the stepper motor 28, thereby reducing the physical dimensions of the pipette 10.

Figure 1H:
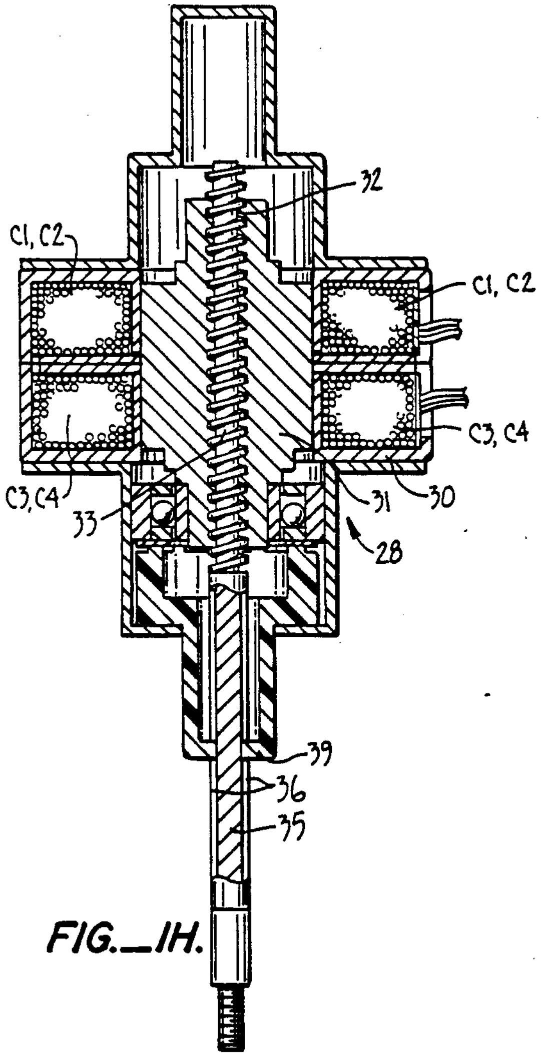
FIGS. 1H and 1I are cutaway views of details of the digital linear actuator included in the pipette shown in FIG. 1A.
Figure 1I:
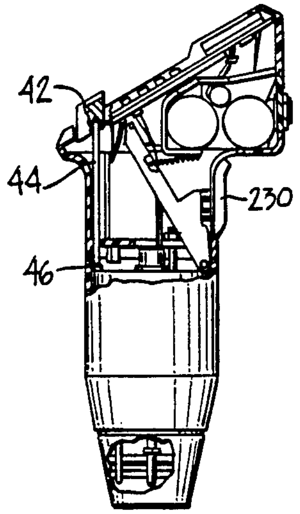
Figure 3:
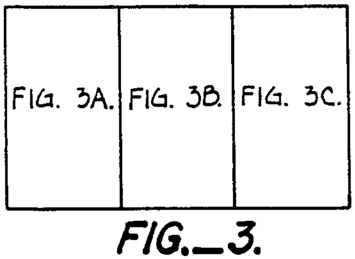
FIG. 3 illustrates how schematic circuit diagrams shown in FIGS. 3A, 3B, and 3C are related.
Figure 3A:
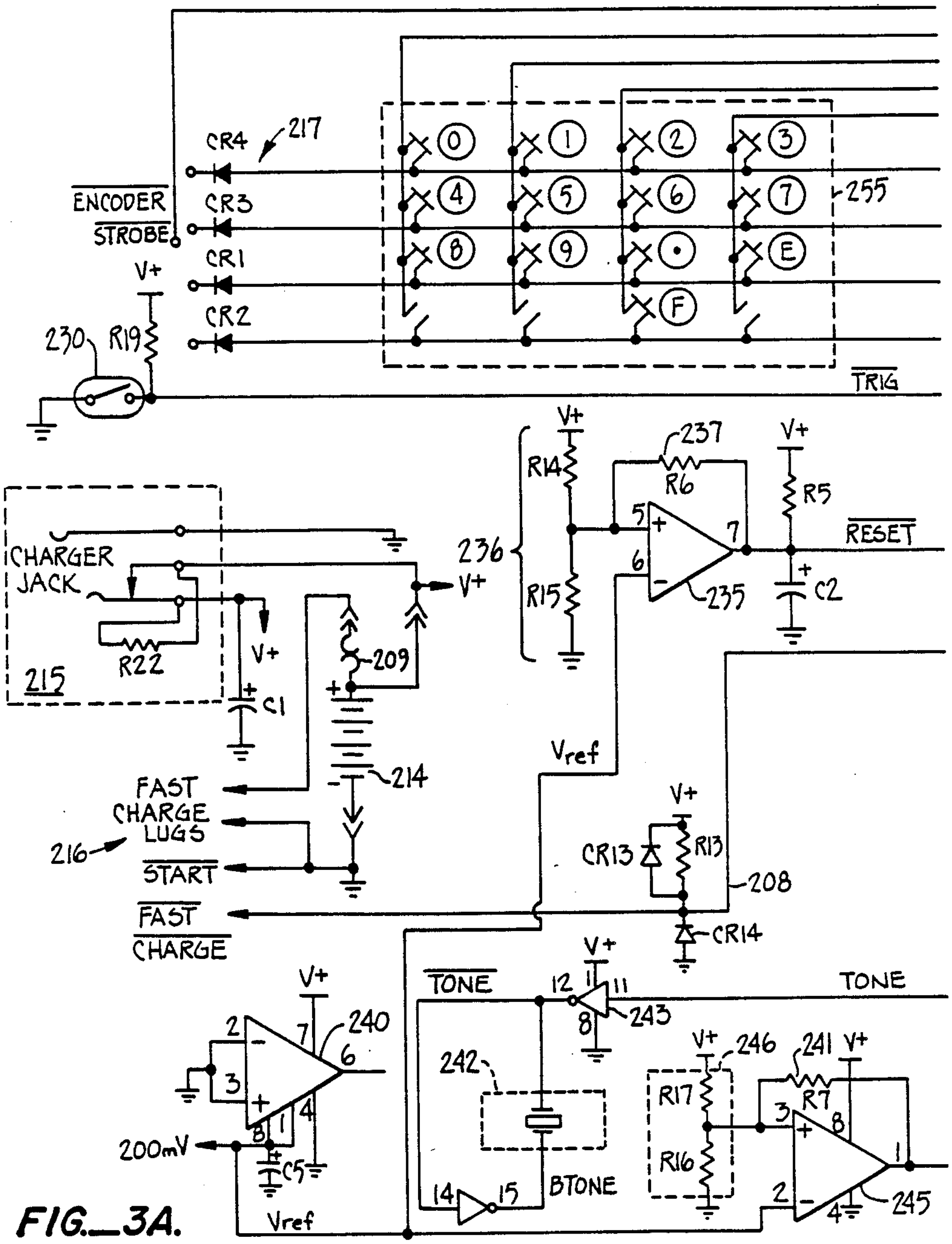
FIG. 3A shows power supply and keyboard circuits which provide signals to a microprocessor circuit.
Figure 3B:
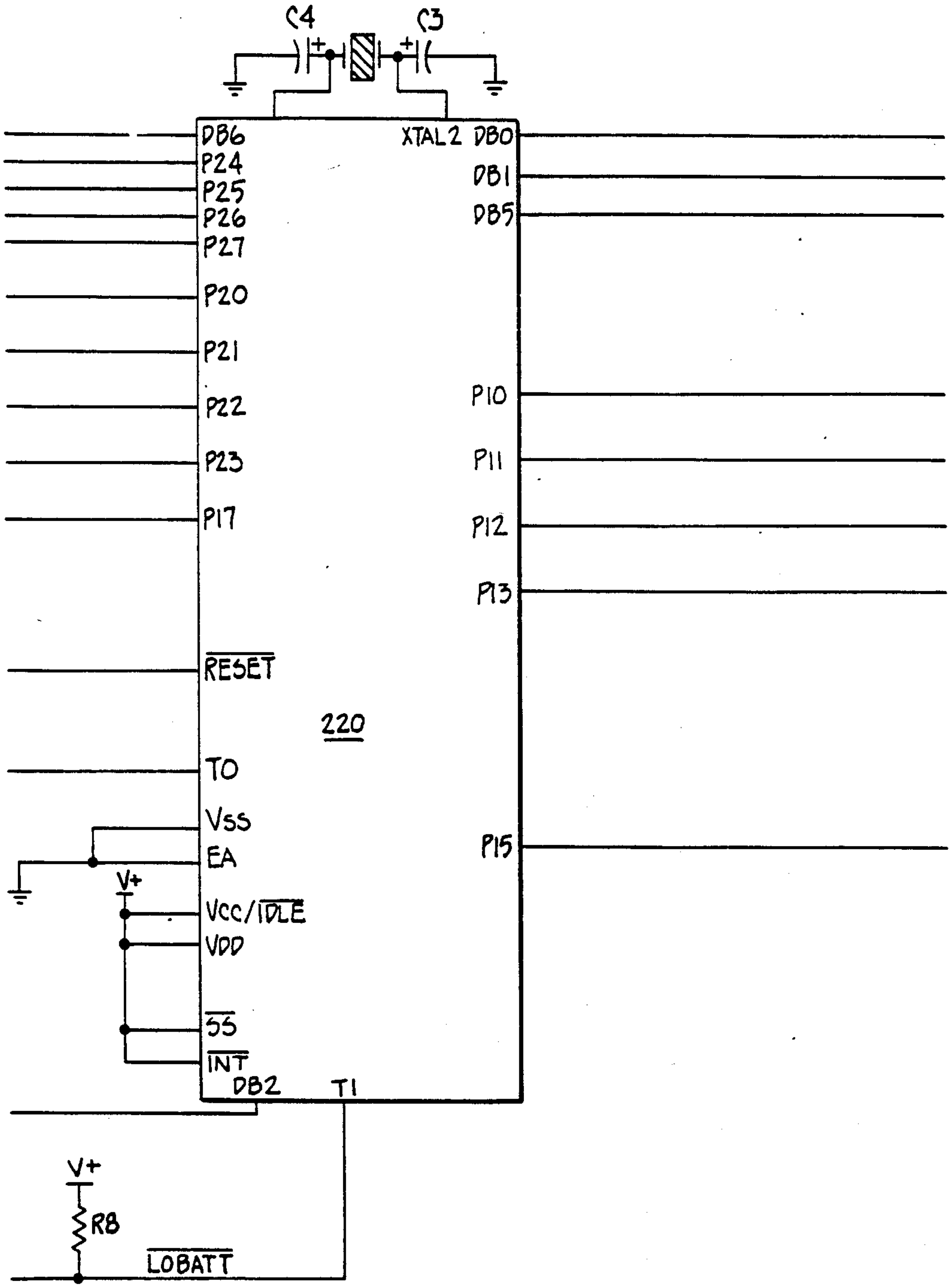
FIG. 3B shows the microprocessor circuit.
Figure 3C:
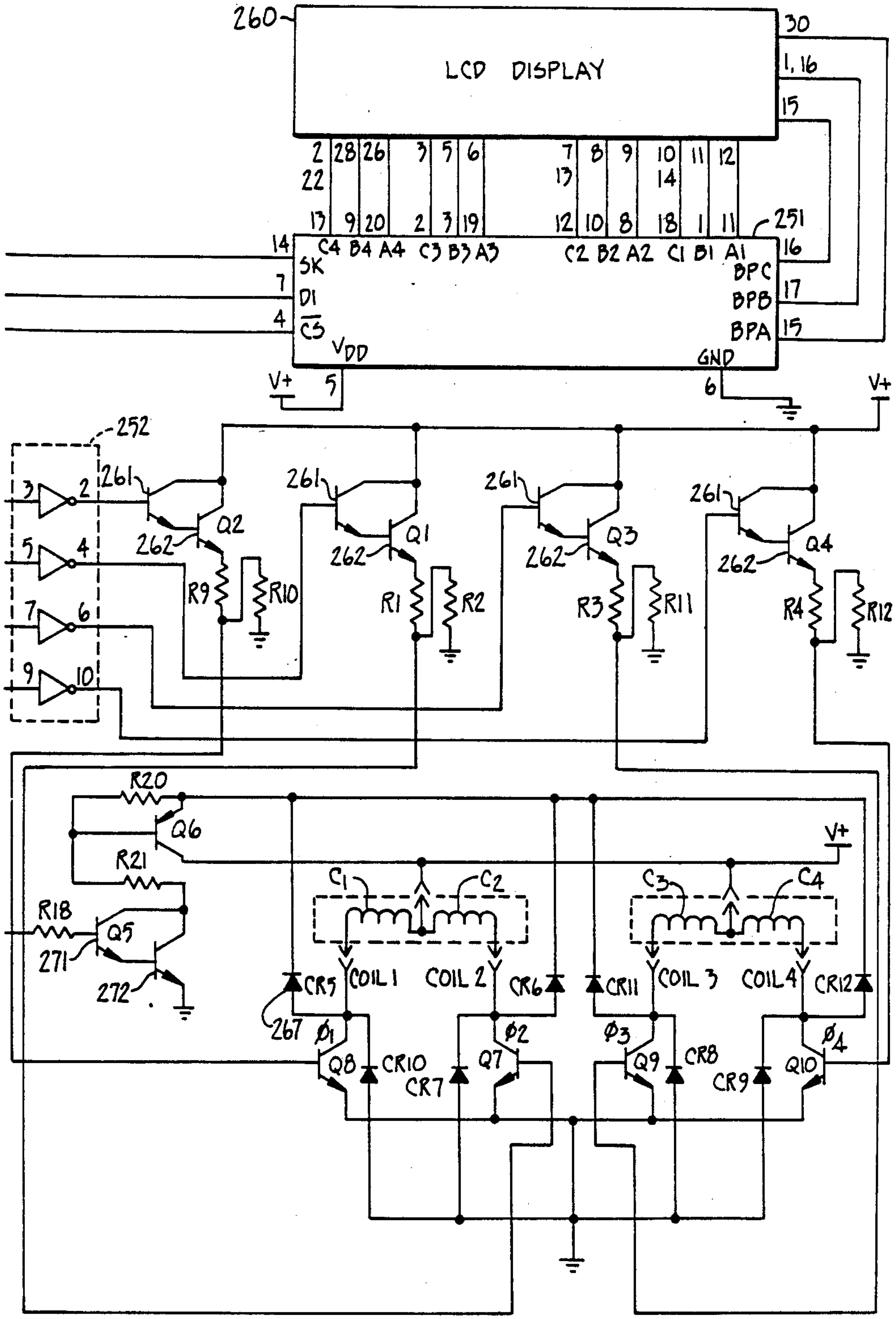
FIG. 3C shows display and motor control circuits to which the microprocessor circuit provides control signals.

Considered in more detail, the stepper motor 28 includes an outside stator 30 with bifilar wound center tapped coils as shown in FIG. 3C at C1, C2, C3, and C4 and in FIG. 1H. An internal rotor 31 includes a threaded central bore 32 into which is threaded a screw 33 connected to an actuator shaft 35. The actuator shaft 35 includes grooves 36 which are confined in a guide 39 secured to the stator 30 for preventing joint rotation of the rotor 31 and screw 33, thereby imparting linear motion to the actuator shaft, indicated by double arrow 38 shown in FIG. 1C.

There are preferably 96 discrete half steps per rotation of the rotor 31 or approximately 3.75 degrees of rotor rotation per half step. These defined motor increments are adjacently discernible from one another in order to permit precisely recoverable rotational position. There are preferably 1,000 half steps per half inch of travel of the actuator shaft 35, so each 3.75 degree arc constitutes 0.0005 inches of advancement of the actuator shaft.

The drive module 12 includes a control circuit which adapts the digital linear actuator to the particular displacement assembly 14 being used. An air buffer and required overstrokes for the pickup and discharge of liquid can be particularly and individually adjusted to the volume of the displacement assembly 14 attached.

As described earlier, the drive module 12 can be used with displacement assemblies 14 of different volumes as shown in FIG. 2. Depending upon the quantity of liquid to be pipetted and/or titrated, an appropriately sized displacement assembly 14 is attached by the retainer ring 20 to the drive module 12. The displacement assemblies 14 preferably include different size pistons 50. This affects the size of the air buffer 105 (FIG. 6C) preferably formed in the displacement chamber 26 and requires individual alteration of the stroke of the actuator shaft 35, and therefore the control circuit must be appropriately programmed.

The drive module 12 can be fitted with an encoder means corresponding to the particular displacement assembly 14 being used. The encoder means can be affixed to a discrete location on the drive module 12 which is either coupled to or uncoupled from the displacement assembly 14. The control circuit can be conformed by the encoder means to the full-scale volume range of the particular displacement assembly 14 attached.

The encoder means can be placed in a particularly conspicuous location on the drive module 12. In this location the encoder means can be labeled with the full-scale volume range of the displacement assembly 14.

For each of the various sizes of the displacement assembly 14, the encoder means preferably comprises an encoder plug 90 (FIG. 1A) inserted into the head 210 of the drive module 12 to contact a diode array 217 (FIG. 3A). The encoder plug 90 informs the control circuit as to which displacement assembly 14 is mounted. If the encoder plug 90 is removed, a liquid crystal display (LCD) 260 shows "---", and all functions are disabled. When an encoder plug 90 is reinserted, the control circuit assumes that the displacement assembly 14 has been changed, and reinitializes itself as for the initial power up. Preferably, the pipette 10 only checks the encoder plug 90 when the "locked" annunciator is off. Therefore, removing or changing the encoder plug 90 when a keyboard 255 is locked has no effect.

The encoder plug 90 encodes the full-scale volume range of the displacement assembly 14 being used. The encoder plug 90, for example, scales the count of control signals $\phi 1$–$\phi 4$ (FIG. 4) to the coils C1–C4 of the stepper motor 28, which determines the distance of travel of the actuator shaft 35 (FIG. 1C).

In accordance with the invention, the pipette 10 includes a control circuit which enables a substantial reduction in power requirements in comparison to the power requirements of known electrically operated pipettes. The pipette 10 is self-contained and has a reduced size and weight so that portable operation is feasible. Furthermore, the pipette 10 can be battery powered.

The control circuit preferably includes a microprocessor circuit which times out all power to the stepper motor 28 in any selected short interval of time, preferably 12.4 milliseconds. This time out causes power to be removed from the coils C1–C4 of the stepper motor 28, which means that the coil magnetic field dissipates and consequently there is no holding torque on the rotor 31. Once the motor rotation ceases, however, resident static friction in the screw 33 included in the digital linear actuator prevents movement of the actuator shaft 35. Static friction has been found to be adequate in preventing undue movement of the actuator shaft 35. By using static friction, no power is required for supplying holding torque, and therefore power requirements are reduced.

Referring to FIGS. 1A and 1C, the keyboard 255 includes keys numbered 0–9 and a decimal key in three rows for entry of information. The upper row also includes an "F" key for designating function selection, and the lower row includes an "E" key for storing entered keyboard data in random access memory and displaying the data in the readout which appears in the LCD 260.

Various additional symbols are imprinted on the panel adjacent the keys, including a musical note for turning on and off sound, an "L38 for locking the keyboard 255, a "C" which serves a dual function, namely, clearing a displayed keyboard entry, and when the 37 F" key is depressed followed by "0" while liquid is being or ready to be dispensed, the liquid is dispensed immediately and the piston 50 returns to a home position, a "P" for selecting a pipette mode, an "M" for selecting a multiple dispense mode, a "T" for selecting a titrate mode, and a "D" for selecting a dilute mode. Modes can be changed whenever the keyboard 255 is active by pressing the function key "F" followed by the appropriately labeled mode key.

The LCD 260 is driven by a triplexed display driver 251 (FIG. 3C) available from National Semiconductor Corp. of Santa Clara, Calif. Referring to the expanded view of FIG. 1A, the LCD 260 includes four digits and a number of other symbols called annunciators. The digits generally display a volume in μl. The LCD 260 operates with a movable decimal point and displays the symbol "μl" to indicate microliters. Occasionally, a short text message is displayed in the digits.

The annunciators describe the state of the pipette 10 at any given time. "KB" turns on when the piston 50 is at the home position to indicate that the keyboard functions are enabled. When the piston 50 is not in the home position, the keyboard 255 is disabled, and the LCD 260 does not display "KB". "locked" indicates that all the keyboard functions except "F,0", "F,8", and "F,9" are disabled. "pickup" indicates that the pipette 10 is ready to pick up liquid. "dispense" indicates that the pipette 10 is ready to dispense liquid. "V1" and "V2" turn on in conjunction with "pick-up", "dispense", or during numeric entry to indicate which volume is being picked up, dispensed, or entered. These annunciators are not used in the pipette mode, since there is only one volume. "M", "T", and "D" turn on individually to indicate that the pipette 10 is in, respectively, multiple dispense, titrate, or dilute modes. If none of these is on, the pipette 10 is in the pipette mode. An inverse or negative letter "f" turns on whenever the "F" (function) key is depressed and to indicate that a two-key sequence is in process.

The "F" key is enabled at all times the stepper motor 28 is not moving (except when the entire pipette 10 is disabled, i.e., when the encoder plug 90 is missing, when the instrument is on the fast charger, or when a low battery condition is detected). When the "F" key is depressed, the "f" annunciator is turned on, thereby indicating that the pipette 10 is in the middle of a two-key function sequence. When the next key is depressed, the pipette 10 turns off the "f" annunciator and then checks to see if a valid function has been selected at this point in time. If so, the pipette 10 performs the specified function. If not, nothing happens. A microprocessor circuit 220 (FIG. 3B) treats a trigger 230 as another button on the keyboard 255, and therefore the sequence "F,trigger" does nothing, as does the sequence "F,6".

There are three special keyboard functions which are implemented by depressing the "F" key followed by a digit. The functions "F,8" and "F,9" are enabled only when the "KB" annunciator is on. "F,0" is enabled except when the "KB" annunciator is on. These functions are not disabled by keyboard lock.

Whenever the piston 50 is not at the home position and is waiting for a trigger pull, an "F,0" sequence causes the pipette 10 to blow out the remaining liquid and return to the home position. If the pipette 10 is already at home, this sequence has no effect. An "F,8" sequence turns off all tones except the error and low battery warbles. Entering this sequence again turns the tones back on. An "F,9" sequence locks the keyboard 255 and turns on the "locked" annunciator. Entering this sequence again unlocks the keyboard 255 and turns off the annunciator. When the keyboard 255 is "locked", the numeric keys (including "E") and the mode selection functions are disabled.

Whenever the "KB" annunciator is on, and the "locked" annunciator is off, the set volume(s) can be changed. This is done by simply entering the number on the keyboard 255. When the first digit is entered, the digits in the LCD 260 flash. If an error is made, entering the sequence "F,0" causes the LCD 260 to flash the previous value, allowing the operator to re-enter a correct value. When the desired value is flashing in the LCD 260, the operator depresses "E" (enter), and the number is stored. If the pipette 10 is in the pipette mode, the LCD 260 stops flashing at this point, and the instrument is ready to pick up the set volume V1. In any other mode, the pipette 10 flashes the second volume V2, giving the operator the opportunity to change the second volume. If the second volume V2 needs no change, the operator merely depresses "E". At this point, the LCD 260 stops flashing and shows the first volume V1, and the pipette 10 is ready to pick up the first volume. If the operator wants to change the second volume V2 without changing the first volume V1, he depresses "E" to get directly to the second volume V2. Pressing "E" twice allows the operator to review the set volumes V1 and V2 without changing anything.

If the value the operator attempts to enter is invalid, the pipette 10 warbles at him, displays the message "Err" for approximately three quarters of a second, and continues to flash the LCD 260. At this point the operator re-enters a legal value.

The rules for numeric values are as follows. No value can be larger than nominal full-scale. In the multiple dispense and titrate modes, volume V2 must be less than or equal to volume V1. In the dilute mode the sum of volume V1 and volume V2 must not exceed 101% of nominal full-scale. With the exception of volume V2 in the titrate mode, all volumes must be greater than zero.

The circuits shown in FIG. 3 are housed in the head 210 of the drive module 12 for providing a self-contained pipette. The circuits provide power, control the movement of the digital linear actuator, and perform data input and output (I/O).

As shown in FIG. 3A, power is either supplied by a battery 214 or from a regulated six-volt direct current power source connected to a charger jack 215. Using the charger jack 215, the battery 214 can be slow charged from the regulated power source in about 14 hours. Alternatively, the battery 214 can be fast charged through lugs 216 in about 1½ hours using a rapid charge stand (not shown). The control circuit preferably monitors that the battery 214 is being fast charged through a line 208. The temperature is monitored by means of a temperature switch 209 to safeguard against overcharging. Rapid charging allows the pipette 10 to be used for approximate 200 cycles with a lightweight battery and used again after 1½ hours.

An advantage of the control circuit is the overall impact in reducing battery size and capacity. Typically, rechargeable batteries of the nickel-cadmium variety are used. In view of the reduced power requirements, these batteries can be of small size. Moreover, rapid battery recharging is available. Predictable full recharging during laboratory coffee breaks and lunch breaks enables full use of the pipette 10 during other periods.

As shown in FIG. 3A, an operational amplifier 240 supplies a constant 200 millivolt (mV) reference voltage $V_{ref}$. A comparator 235 uses $V_{ref}$ and a voltage divider 236 to monitor the power supply voltage V+. When V+ falls unacceptably, for example, below 3.5 volts, the comparator 235 transmits a low voltage signal to a $\overline{\text{RESET}}$ microprocessor circuit 220 (FIG. 3B) to initiate resetting the drive module 12. A hysteresis determined by a resistor 237 delays the reset until V+ reaches 5 volts, whereupon the comparator 235 transmits a high voltage signal to the microprocessor circuit 220 (FIG. 3B).

A comparator 245 uses $V_{ref}$ and a voltage divider 246 to provide a low battery signal to a T1 pin of the microprocessor circuit 220 (FIG. 3B) at about 4.8 volts and, in turn, to the LCD 260. A resistor 241 hysteresis delays the low battery display reset until V+ rises to about 5 volts.

Whenever the pipette 10 is waiting for keyboard input or a trigger pull, the instrument checks for a low battery condition or rapid charge signal. The low battery signal from the comparator 245 is monitored only during times when the coils C1–C4 of the stepper motor 28 are not being energized. If a low battery condition is detected, the pipette 10 warbles and displays the message "Lob". This message stays on the LCD 260 for as long as the low battery condition is true, but not less than 250 milliseconds. While this message is displayed, all keyboard and trigger functions are disabled. When the low battery condition goes away, the display is restored, and operation continues, unless the battery 214 had discharged far enough to cause a reset, in which case the pipette 10 reinitializes itself. If the rapid charge signal is detected, indicating that the pipette 10 has been connected to the rapid charger, the instrument displays "FC", and all functions are disabled until the signal goes away, at which time the instrument recovers as in the low battery situation.

The movement of the actuator shaft 35 (FIG. 1C) and the readout which appears in the LCD 260 are controlled by the microprocessor circuit 220 shown in FIG. 3B, which is preferably a type 80C49 CMOS integrated circuit manufactured by the OKI Corp. of Tokyo, Japan. Pipetting and titrating modes selected through the keyboard 255 are initiated by the trigger 230 which transmits a start signal to a port P17 of the microprocessor circuit 220 to activate successive program sequences.

A modified duty-cycled recirculating chopper drive signal is preferably used in conjunction with the digital linear actuator included in the pipette 10. Power to the coils C1–C4 of the stepper motor 28 is supplied in a two-part duty cycle. After a sufficient time interval to build up the magnetic field in the coils C1–C4 of the stepper motor 28, a recirculating mode is switched into operation. This recirculating mode duty cycles with the power mode to provide an increased average current flow in the stator 30 of the stepper motor 28. Advantageously, a predictable torque with minimum consumption of power results. Upon commutation of the coils C1–C4 of the stepper motor 28, the recirculating mode is switched off.

The microprocessor circuit 220 provides square wave pulse trains to control energization of the coils C1–C4 of the stepper motor 28. Appropriate control signals are applied by ports P10–P13 of the microprocessor circuit 220 to inverting buffers 252 as shown in FIG. 3C, which can be integrated circuit type 4049 from National Semiconductor Corp. The buffers 252 invert the control signals and assure that the power transistors are off if the microprocessor circuit 220 is in a reset state to avoid inadvertent connection or short circuit of the coils C1–C4 of the stepper motor 28 directly 10 across the power supply V+. The buffers 252 also prevent damaging current backflow from the power supply V+ to the microprocessor circuit 220.

Darlington pairs of transistors 261, 262 provide gain by a factor in the range of 10,000. The Darlington pairs 261, 262 control the bases of power transistors Q7–Q10 in accordance with the sequence of the control signals $\phi 1$–$\phi 4$ shown in FIG. 4. The transistors Q7–Q10 switch current through the respective coils C2, C1, C3, and C4 of the stepper motor 28.

Figure 4:
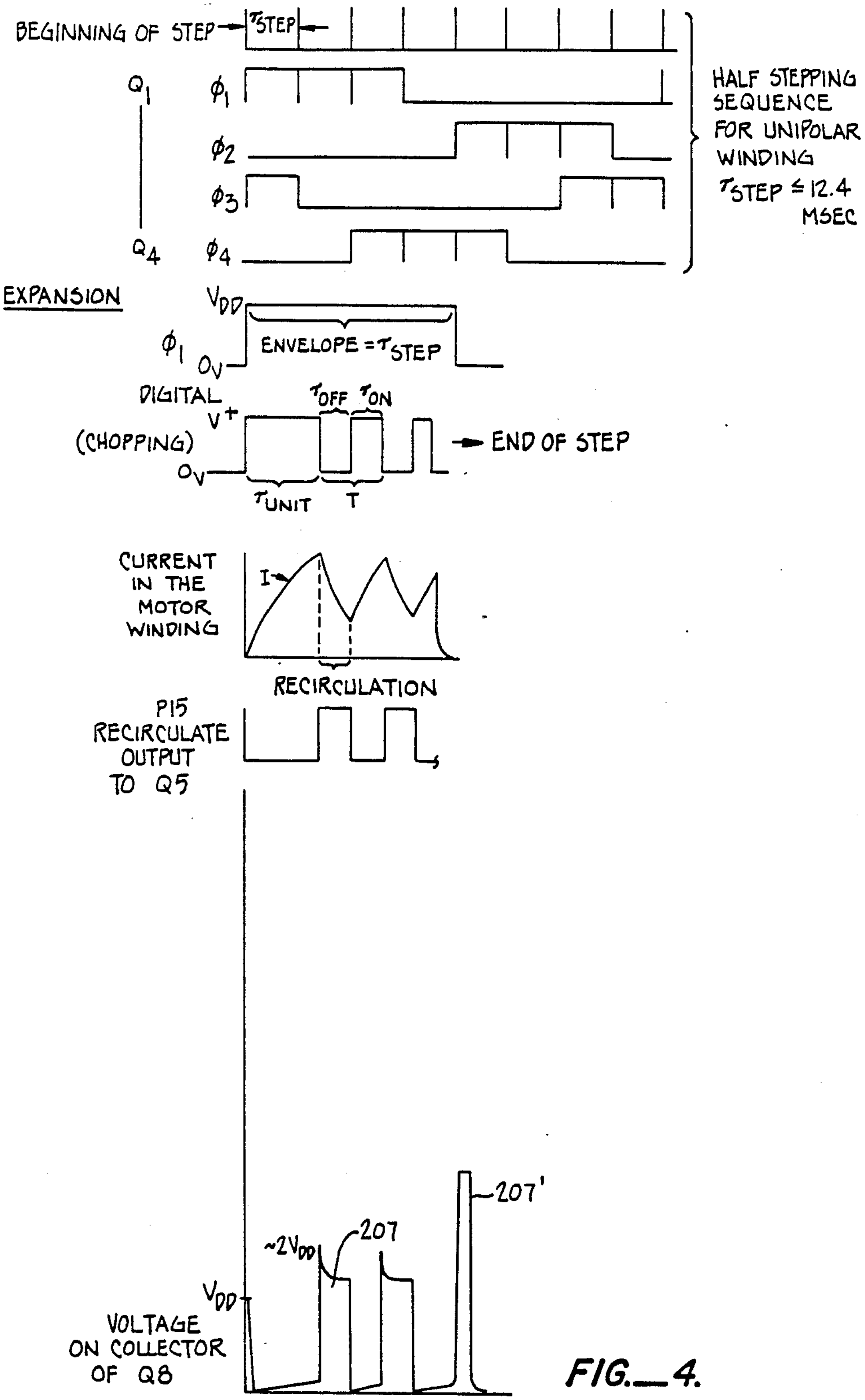
FIG. 4 is a timing diagram of the operation of the control circuit shown in FIG. 3.

Initially, the duty cycle of the power supplied to a coil immediately following energization as a result of commutation is preferably of a period $\tau_{unit}$ as shown in FIG. 4. The period $\tau_{unit}$ can have a longer duration than the subsequent periods $\tau_{on}$ during which power is supplied to the coil. This more rapidly builds up the magnetic field in the coil immediately following energization as a result of commutation, thereby producing greater torque and improving response. The period $\tau_{unit}$, for example, can be 300 microseconds, whereas the period $\tau_{on}$, for example, can be 100 microseconds and the period $\tau_{off}$ can be, for example, 60 microseconds in the case where one of the coils C1–C4 of the stepper motor 28 is energized. Furthermore, the period $\tau_{unit}$, for example, can be 140 microseconds, whereas the period $\tau_{on}$, for example, can be 60 microseconds and the period $\tau_{off}$ can be, for example, microseconds in the case where two coils C1–C4 of the stepper motor 28 are energized.

The current pulses supply power greater than the rated capacity of the coils C1–C4. To prevent the coils C1–C4 from overloading, the microprocessor circuit 220 chops the pulse into $\tau_{unit}$, $\tau_{off}$, and $\tau_{on}$ as shown in FIG. 4.

When the transistors Q7–Q10 open during the periods $\tau_{off}$, the voltage on the collectors (connected to the coils C1–C4 to which duty-cycled power is being applied) flies up and overcomes the threshold of the transistor Q6 as will be described shortly. Consequently, current recirculates through the coils C1–C4, the respective diodes CR5, CR6, CR11, and CR12 and the transistor Q6 for increasing efficiency and reducing power consumption at all speeds of the stepper motor 28.

For example, in a typical case of energizing a coil, such as the coil C1, the microprocessor circuit 220 (FIG. 3B) applies a low voltage at the port P10, which is inverted by the top inverter 252 and applied to the left Darlington pair 261, 262. This provides a large current to the base of the transistor Q8 which closes and conducts current from one power supply terminal, namely, V+, through the coil C1 to the other power supply terminal, namely, common, and causes a half step rotation of the rotor 31.

The control signal provided by the microprocessor circuit 220 at the port P10 is preferably an eight Kilohertz square wave which, through the respective Darlington pair 261, 262, turns the transistor Q8 on and off. This produces a current in the coil C1 as shown by the sawtooth wave in FIG. 4. When the transistor Q8 opens, the voltage in the coil C1 flies up as shown at 207 in FIG. 4 sufficiently to cause a recirculating current through the diode CR5 and the transistor Q6 and the coil C1 during periods when a transistor pair 271, 272 is on.

In accordance with the invention, interruption of the recirculation occurs during operation of the stepper motor 28 except periods $\tau_{off}$ when power is not being supplied to an otherwise energized coil by the control circuit after a sufficient magnetic field has been built up in the coil following energization as a result of commutation. Consequently, gateable recirculation is provided during operation of the stepper motor 28. Interruption of the recirculating current path during periods $\tau_{on}$ when power is being applied to an energized coil by the control circuit reduces losses as compared to known recirculating chopper drives. Furthermore, in known recirculating chopper drives, the preserved magnetic field of the rotor is slow to decay. Especially where high speed movement occurs, the magnetic field from the coil active in the previous step offsets the torque induced by the coil energized for the present step. In accordance with the invention, the recirculating current path is immediately opened for the previously energized coil upon commutation of the coils C1–C4 to cause movement of the rotor 31 between adjacent steps. The voltage in disconnected coils rapidly rises, thereby causing rapid magnetic field collapse. Consequently, movement of the rotor 31 to adjacent coil magnetic dispositions is facilitated. As a result, no appreciable resistance to high speed movement is present.

The control circuit includes the transistor Q6 and transistor pair 271, 272 for providing gateable recirculation instead of a resistor. During the periods $\tau_{on}$, the microprocessor circuit 220 applies a control signal from a port P15 to cause the transistor pair 271, 272 to open, in turn opening the transistor Q6 and prohibiting current recirculation, thereby reducing losses which would appear if a resistor was present instead of the transistor Q6. This prolongs battery power.

With regard to the coil C1, for example, the back EMF of the coil C1 causes recirculating current when power is not being applied to the coil C1 from the power supply during the periods $\tau_{off}$ of the control circuit duty cycle, which maintains current flowing in the coil C1, thereby conserving the energy stored in the magnetic field. During the periods $\tau_{off}$, the microprocessor circuit 220 applies a control signal from the port P15 to cause the transistor pair 271, 272 to close, in turn closing the transistor Q6 and allowing current recirculation through the coil C1, the diode CR5, and the emitter-collector circuit of the transistor Q6. This can be a problem when it is desired to commutate the coils C1–C4 of the stepper motor 28 rapidly. The problem is addressed by programming the microprocessor circuit 220 to apply a control signal from the port P15 to cause the transistor pair 271, 272 to open, in turn opening the transistor Q6 and cutting off the recirculating current when the coils C1–C4 of the stepper motor 28 are commutated. With the transistor Q6 open, the back EMF in the coil C1 flies up as shown at 207' in FIG. 4, and the magnetic field in the coil collapses very rapidly while a magnetic field is built up in the next coil or coils.

When the stepper motor 28 is being single stepped at slow speeds, current is provided in timed voltage envelopes of up to 12.4 milliseconds, after which the transistor pair 271, 272 is opened to collapse the magnetic field rapidly. The microprocessor circuit 220 applies a control signal to close the transistor pair 271, 272 for disabling current recirculation at the end of the voltage envelope in the control signal to the transistor Q2 and for maintaining the transistor pair 271, 272 open to prevent recirculation of current when the coil C1 is commutated.

In the half step environment, the duty cycle can be controlled to provide both at the full step and half step the same amount of displacement. By the expedient of making the duty cycle longer in the energizing of a single coil (on the order of 60%) and shorter in the energizing of dual coils (on the order of 50%), uniform torque and constant movement occurs in the half stepped motor, which provides smoother operation.

A further advantage of the control circuit is that the stepper motor 28 moves in discrete movements of adjacently discernible programmable half steps. Where the rotor 31 comes to rest at a position that is slightly off of the precise half step position, correction to the precise and called for half step position occurs on the next called for step. A high degree of rotational reliability in response to stepper motor count and consequent precise linear actuation result.

Generally, over-movements are negligible, since the static friction of the screw 33 is sufficient to provide reliable braking to the actuator shaft 35. Current through the coils C1–C4 of the stepper motor 28 to provide holding torque braking is not necessary, which preserves battery power.

Tone signals preferably provide the operator of the pipette 10 an acoustical sense of the operating instrument. As shown in FIG. 3A, a piezoelectric tone generator or bender 242 is connected through an amplifier 243 to generate tone sequences in response to appropriate signals from the microprocessor circuit 220.

Figure 5:
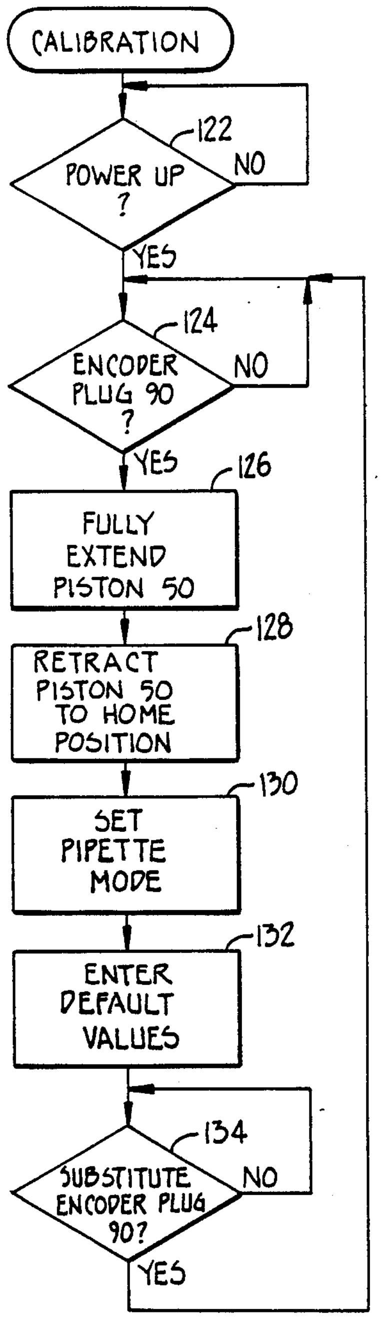
FIG. 5 illustrates a method for calibrating a pipette in accordance with the invention.

In accordance with the invention, calibration of the digital linear actuator is also provided as shown in FIG. 5. According to this aspect of the invention, upon either powerup or restoration of power after power loss, indicated by the numeral 122, or substitution of a different displacement assembly 14 and encoder plug 90, indicated by the numeral 124, the digital linear actuator undergoes full extension, indicated by the numeral 126. Typically, the digital linear actuator reaches full extension with the piston 50 contacting a travel limit interior of the displacement chamber 26 of the displacement assembly 14. Thereafter, the stepper motor 28 electrically slips. Electrical slippage of the stepper motor 28 continues until the control circuit has commanded all steps required for a full extension. Upon completion of the full extension, a programmed retraction to a home position (the physical position of the piston 50 when ready to pick up liquid) occurs, indicated by the numeral 128. This programmed retraction introduces an interstitial air space within the displacement chamber 26 particular to the size of displacement assembly 14 attached to the digital linear actuator. Furthermore, the pipette 10 is set in the pipette mode, indicated by the numeral 130, and various default values for the volumes V1 and V2 are entered, indicated by the numeral 132. If the displacement assembly 14 and encoder plug 90 are replaced, reinitialization takes place, indicated by the numeral 134. Preferably, during this process, which takes about eight seconds, the digits on the LCD 260 are blanked, and all functions are disabled.

Figure 6E:
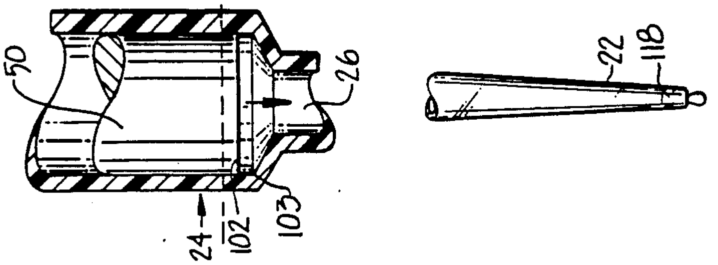
FIGS. 6A–6E illustrate calibration of the pipette shown in FIG. 1A, as well as picking up and dispensing liquid with the pipette.
Figure 6D:
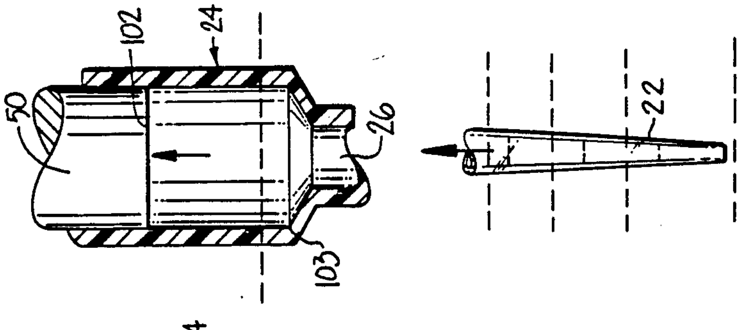
Figure 6C:
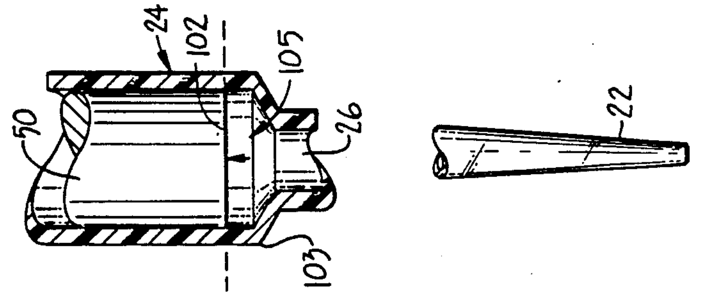
Figure 6B:
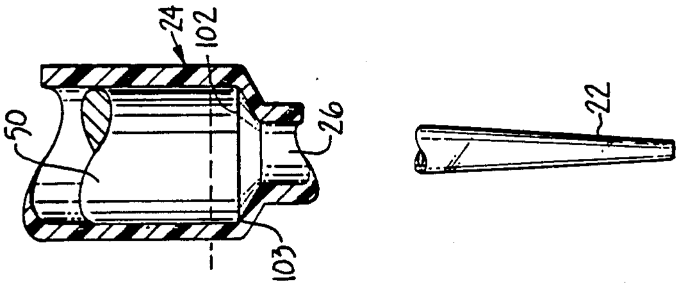
Figure 6A:
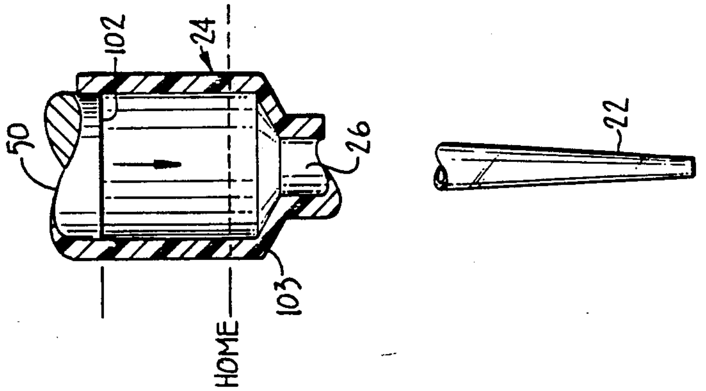

Movement of the piston 50 upon calibration is shown in FIGS. 6A, 6B, and 6C. First, assume that the digital linear actuator has stopped, leaving the piston 50 in a random position as shown in FIG. 6A. The microprocessor circuit 220 (FIG. 3B) energizes the coils C1–C4 of the stepper motor 28 to extend the piston 50 as far as possible into the cylinder 24. The travel limit is where the face 102 of the piston 50 strikes the shoulder 103 at the lower end of the displacement chamber 26 as shown in FIG. 6B, which blocks further advancement.

The microprocessor circuit 220 continues to energize the coils C1–C4 of the stepper motor 28 after the piston face 102 is seated against the shoulder 103, thereby causing the stepper motor to slip. Preferably, the microprocessor circuit 220 then reverses the stepping sequence to move the piston 50 away from the shoulder 103 a predetermined number of steps to the home position. This draws in an interstitial air volume 105 as shown in FIG. 6C, which buffers and prevents liquid from contacting the piston face 102 in order to avoid contamination of liquid subsequently pipetted. However, an air buffer need not be provided (i.e., the air buffer can be zero). In an alternate and less preferred embodiment, an optical flag 37 (FIG. 1C) connected to the actuator shaft 35 can be used to determine the home position of the piston 50.

An advantage of calibration in accordance with the invention is that the stroke of the digital linear actuator is individually adjusted to the particular displacement assembly 14 being used. Thus, a precisely determined air buffer 105 can be provided at the interface between the piston 50 and the liquid being handled during pipetting.

Considered in more detail, when power is first applied (i.e., dead batteries recharged, batteryless unit is connected to wall power outlet, new batteries installed, etc.) or when the encoder plug 90 is removed and reinserted, the pipette 10 further initializes itself as follows. Not only is the piston 50 relocated to the home position, but the pipette 10 is set in the pipette mode, indicated by the step 130, and defaults the volumes V1 and V2 for all modes, indicated by the step 132, as follows:

| MODE | V1 | V2 |
|---|---|---|
| Pipette | NFS | — |
| Multiple Dispense | NFS | 1% NFS |
| Titrate | NFS | 0 |
| Dilute | NFS | 1% NFS |

where NFS is Nominal Full-Scale Volume (e.g., 1,000 μl with a 1,000 μl displacement assembly 14 attached).

The pipette 10 has four operating modes: pipette, multiple dispense, titrate, and dilute, which are described in detail hereinafter. When the pipette 10 is initially powered up, the instrument is in the pipette mode. The mode can be changed whenever the "KB" annunciator is on and the "locked" annunciator is off by entering the following sequences: "F,1" for pipette; "F,2" for multiple dispense; "F,3" for titrate; and "F,4" for dilute. The pipette 10 maintains a separate volume memory for each mode, so that when the operator switches, for example, from pipette to dilute and back, the volume setting for pipette has not changed, regardless of what settings were used while in the dilute mode.

Figure 7:
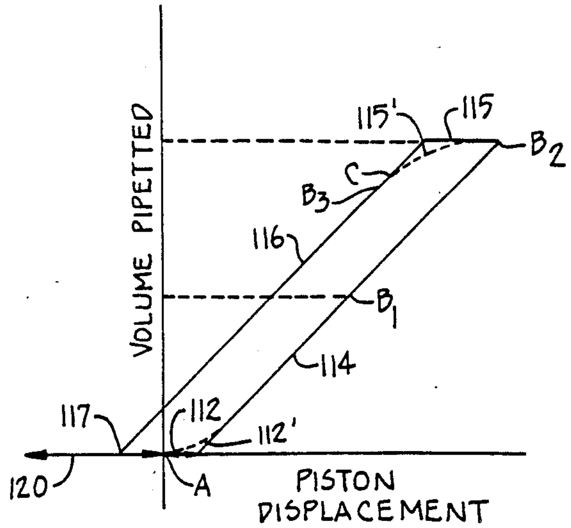
FIG. 7 is a graph which shows the volume of liquid displaced through a displacing piston cycle of the pipette shown in FIG. 1A.

A complete operational cycle is illustrated in the FIG. 7 graph which shows piston displacement on the horizontal axis and pipetting volume on the vertical axis. The proportions of the graph vary with the displacement size of the piston 50 and the volume of the displacement chamber 26 and tip 22. Thus, there is a family of curves similar to FIG. 7 for the various displacement assemblies 14. The volume enclosed and the overstrokes required vary. However, the microprocessor program takes these changes in proportions into account based on the encoder plug 90 inserted, thereby greatly improving the accuracy of pipetting and/or titrating.

A number of factors, including liquid surface tension and the expansibility of the air buffer 105, resist pipetting. Consequently, there must be an initial stroke from the home position A as illustrated by an interval 112 shown in FIG. 7 before liquid begins to be taken in. Piston displacement stops at a position B1, if a liquid volume B1 is desired, or at a position B2 for a volume B2 as shown in FIG. 7.

There is a reverse problem at the beginning of discharge. Air buffer compressibility and liquid surface tension absorb piston displacement and delay any liquid discharge.

The initial movement of liquid can be tapered as illustrated by the path 115' where air buffer compressability and surface tension, as well as liquid viscosity, affect pipetting and/or titrating performance. The graph is for a liquid having the viscosity and surface tension properties of water.

Whenever an amount of liquid less than the total volume pipetted is to be initially dispensed, such as when predetermined amounts are serially dispensed in the multiple dispense mode or amounts are dispensed in the titrate mode, an additional procedure is preferably followed. When liquid is initially taken into the pipette 10, a volume in excess of the total needed is taken into the instrument, as represented by the volume B2 in FIG. 7. Thereafter, at the completion of the initial liquid intake, a small amount of discharge is effected by extending the piston 50 slightly beyond the point C in the FIG. 7 graph, which neutralizes the air buffer spring force and neutralizes surface tension and discharges a small amount of liquid so that only a volume B3 of liquid, that is, the desired volume, is contained. Consequently, the liquid is ready for immediate accurate discharge in a desired volume.

Furthermore, the liquid discharge is not complete at the home position A shown in FIG. 7. The piston 50 must move slightly beyond the home position A to an overstroke position indicated at 117 in FIG. 7 to complete the discharge. The pipette 10 preferably stops for a programmed period of time, on the order of one second, while liquid runs down the interior walls of the tip 22 and accumulates in a drop 118 as shown in FIG. 6E.

An overstroke 120 (FIG. 7) blows out the accumulated drop 118. Any liquid clinging to the outside of the tip 22 can be wiped off.

When the pipette 10 is initialized, or when the operator enters the sequence "F,1", the instrument enters the pipette mode. This is indicated by all of the "MTD" annunciators being off. The volume to be pipetted can be changed by means of the keyboard 255 as described above.

Figure 8:
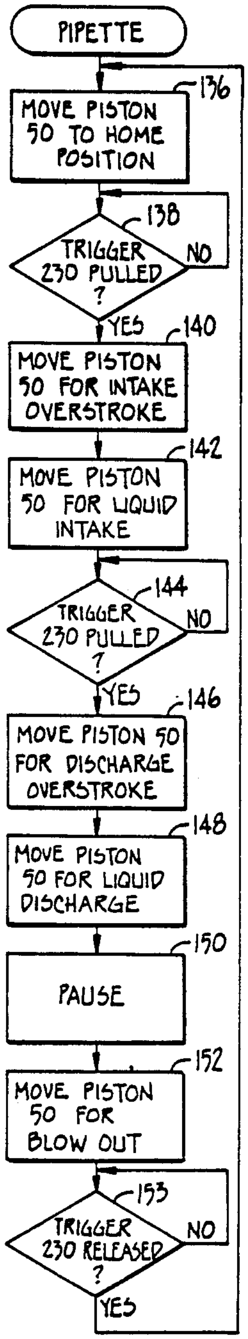
FIG. 8 illustrates a method for pipetting in accordance with the invention.

An automated pipette mode is provided in accordance with the invention as shown in FIG. 8. According to this aspect of the invention, pipetting occurs from the home position, that is, the position optimally chosen from the travel limit of the piston 50 to preserve the desired air buffer 105, indicated by the numeral 136. Intake movement occurs in response to pulling the trigger 230, indicated by the numeral 138, with initial movement being undertaken to provide the requisite overstroke, indicated by the numeral 140, for the beginning movement of liquid into the pipette 10. After the overstroke and the consequent beginning movement of liquid, movement of the piston 50 continues, indicated by the numeral 142, and the particular programmed volume to be drawn into the displacement chamber 26 and tip 22 of the particular displacement assembly 14 attached occurs. After this movement has ceased, the pipette 10 is moved to the discharge location. At this location, in response to pulling the trigger 230, indicated by the numeral 144, a first movement occurs having an increment required for liquid movement to the point of discharge, indicated by the numeral 146. A second and additional movement having the increment for the discharge of the called for pipetted amount causes the contained volume to be discharged, indicated by the numeral 148. Assuming that total discharge is desired, this first movement is followed by a programmed pause in the operation of the pipette 10, indicated by the numeral 150. During this programmed pause, liquid within the tip 22 drips to a discharge position at or near the tip and accumulates. Upon completion of this accumulation, movement of the piston 50 past the home position occurs, indicated by the numeral 152. A complete blowout of the pipetted contents results. Upon release of the trigger 230, indicated by the numeral 153, the piston 50 is returned to the home position. Surface tension held liquid can easily be wiped from the tip 22.

Considered in more detail, initially the "pickup" annunciator is on, indicating that the pipette 10 is ready for a pickup/dispense cycle. When the trigger 230 is pulled, the piston 50 moves up the specified amount. At the end of the stroke, the "pickup" annunciator goes off, the "dispense" annunciator goes on, and the pipette 10 beeps. With the next pull of the trigger 230, the piston 50 moves down to expel the liquid. At the bottom of the stroke, the pipette 10 pauses for one second, then moves down to blow out any remaining liquid in the tip 22. The piston 50 can pause for a minimum of one second at the bottom of the blowout stroke before returning to the home position. This pause can preferably be extended by holding the trigger 230 down, in which case the piston 50 does not return to the home position until the trigger 230 is released.

Figure 9:
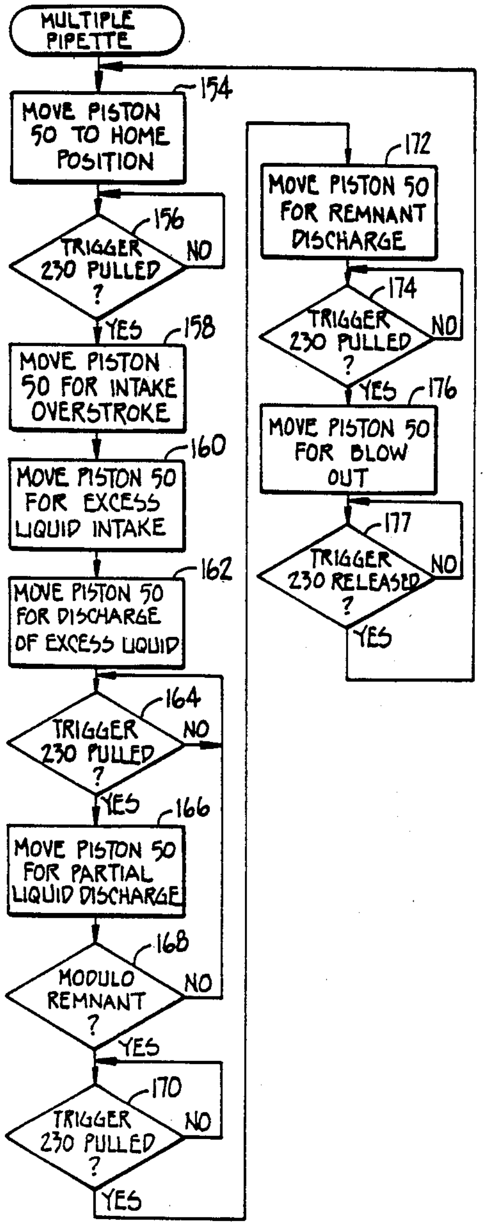
FIG. 9 illustrates a method for multiple dispensing in accordance with the invention.

A multiple dispense mode is additionally provided in accordance with the invention as shown in FIG. 9. When the operator enters the sequence "F,2", the pipette 10 enters the multiple dispense mode, indicated by the "M" annunciator. The pickup and dispense volumes can be set by means of the keyboard 255 as described above. According to this aspect of the invention, upon pulling the trigger 230, indicated by the numeral 156, an initial draw of the liquid to be pipetted occurs, indicated by the numerals 158 and 160. When liquid is initially taken into the pipette 10, a volume in excess of the total needed is taken into the displacement chamber 26 and tip 22, indicated by the numeral 160. Thereafter, at the completion of the initial liquid intake, a small amount of discharge occurs, indicated by the numeral 162, which leaves a desired volume V1. This small amount of discharge neutralizes the air buffer spring force and neutralizes surface tension. Upon withdrawal of the pipette 10 from the intake reservoir, the instrument is fully readied for liquid discharge. Thereafter, and when the pipette 10 is moved to a discharge location, a second pulling of the trigger 230, indicated by the numeral 164, causes the discharge of the initial volume V2 of the called for multiple pipetted amount, indicated by the numeral 166. This volume V2 continues to be discharged every time that the trigger 230 is pulled until a modulo remnant remains, indicated by the numeral 168. When only the modulo remnant remains, the modulo amount is indicated, discharged upon the next pull of the trigger 230, indicated by the numerals 170 and 172, and the above described blowout cycle is implemented at the end of discharge of the modulo remnant, indicated by the numerals 174, 176, and 177.

Considered in more detail, initially the "pickup" and "V1" annunciators are on indicating that the pipette 10 is ready to pick up the volume V1 of liquid. When the trigger 230 is pulled, the piston 50 moves up the specified distance. At the end of the pickup stroke, the pipette 10 beeps, turns off the "pickup" and "V1" annunciators, turns on the "dispense" and "V2" annunciators, and displays the second volume V2. When the trigger 230 is pulled, the pipette 10 dispenses the displayed volume V2. This volume is dispensed with each trigger pull, until just before the final dispense. At the end of the next to last dispense, the pipette 10 beeps, turns off the "V2" annunciator, and displays the amount of liquid remaining in the tip 22. This happens even if the amount remaining is equal to the specified dispense volume V2. This is because the accuracy of the final volume is not certain. Preferably, if the dispense volume V2 exactly equals the pickup volume, the pipette 10 beeps twice at the end of the pickup stroke, once to indicate the end of the pick-up, and once to indicate that the last volume is about to be dispensed. At the end of the final dispense, the pipette 10 beeps again and turns off the "dispense" annunciator. After the next pull of the trigger 230, the pipette 10 goes through a blowout cycle as described above.

According to a modification of the multiple dispense mode, discharge occurs with the tip 22 already immersed either on or under the discharge reservoir interface. Consequently, in the actual discharge, surface tension forces are no longer a source of inaccuracy. Very precise dispensing at extremely low volumes can occur, for example, on the order of below 0.1 $\mu l$ with a 100 $\mu l$ displacement assembly 14. Also by way of example, the pipette 10 can be used to dispense precise 0.05 $\mu l$ increments with a 25 $\mu l$ displacement assembly 14.

Figure 10:
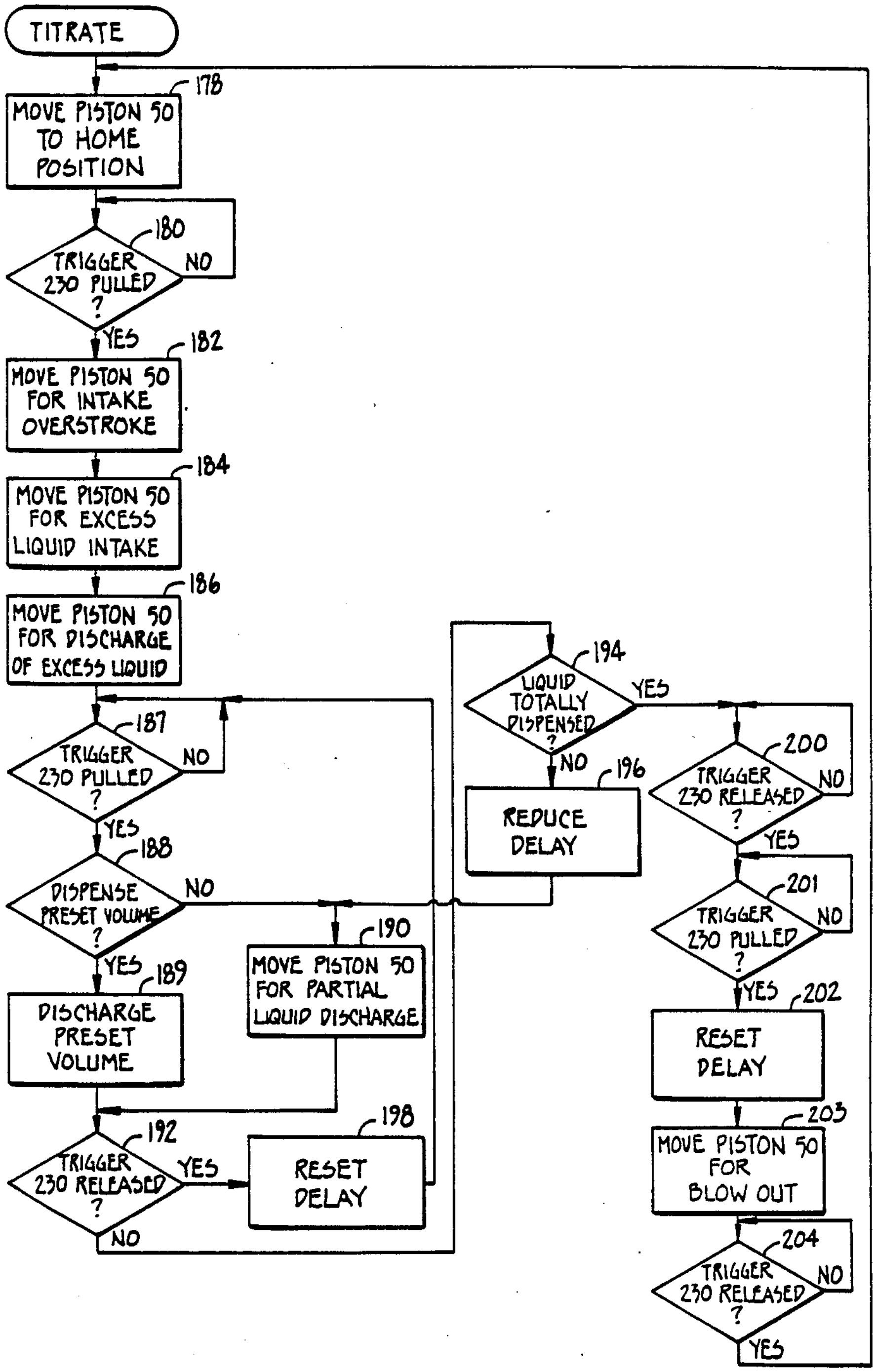
FIG. 10 illustrates a method for titrating in accordance with the invention.

In accordance with the invention, a titrate mode is also provided as shown in FIG. 10. When the operator enters the sequence "F,3", the pipette 10 enters the titrate mode, indicated by the "T" annunciator. The pickup and initial dispense volumes V1 and V2 can be changed by means of the keyboard 255 as described above. Volume V2, the initial dispense volume, can be zero. This is the only case in which a zero volume can be entered. According to this aspect of the invention, liquid is first taken in when the trigger 230 is pulled, indicated by the numerals 180 and 182. When liquid is initially taken into the pipette 10, a volume in excess of the total needed is taken into the displacement chamber 26 and tip 22, indicated by the numeral 184. Thereafter, at the completion of the initial liquid intake, a small amount of discharge occurs, indicated by the numeral 186, which leaves a desired volume V1. This small amount of discharge neutralizes the air buffer spring force and neutralizes surface tension. Upon withdrawal of the pipette 10 from the intake reservoir, the instrument is fully readied for liquid discharge. Then, at the discharge location, the trigger 230 is pulled, indicated by the numeral 187, and a general and programmed volume V2 of titrating liquid is discharged, indicated by the numerals 188 and 189. Thereafter, titrating liquid is incrementally discharged with the time interval between discharged increments being gradually decreased to provide an overall accelerated flow, indicated by the numerals 190, 192, 194, and 196. These increments of discharge cease their accelerating flow upon releasing the trigger 230, indicated by the numerals 192 and 198. Upon repulling the trigger 230, the described acceleration begins anew. Dispensing can continue until complete discharge occurs, indicated by the numeral 194. After the liquid has been totally dispensed, the trigger 230 is released and then repulled, indicated by the numerals 200 and 201, whereupon the accelerating flow is reset, indicated by the numeral 202, and blowout of the remaining contents is then performed as described above, indicated by the numerals 203 and 204.

Considered in more detail, initially the "pickup" and "V1" annunciators are on, and the LCD 260 displays the pickup volume V1. When the trigger 230 is pulled, the piston 50 moves up the specified volume V1. At the end of the pickup stroke, the pipette 10 beeps, turns off the "pickup" and "V1" annunciators, turns on the "dispense" annunciator, and displays "0".

At this point, the action depends on whether the second volume V2 is zero or non-zero. If the volume V2 is zero, both the "V1" and "V2" annunciators are off, and when the trigger 230 is pulled, the pipette 10 starts the titrate sequence. If the second volume V2 is non-zero, the "V2" annunciator turns on, indicating that there is an initial dispense volume. When the trigger 230 is pulled, the pipette 10 dispenses this amount. At the end of this dispense, the "V2" annunciator is turned off, the amount dispensed is displayed, and the pipette 10 waits for the trigger 230 to be pulled again. If the trigger 230 is held, the pipette 10 does not wait at the end of the dispense, but proceeds directly to titration.

The titration sequence proceeds as follows. When the trigger 230 is pulled, the pipette 10 takes a few steps at a slow rate, then takes a few steps at a faster rate, and so on until the instrument is running at full titrate speed. After each step, the LCD 260 is updated to reflect the total volume of liquid dispensed. When the trigger 230 is released, the pipette 10 stops stepping. When the trigger 230 is pulled again, the cycle is repeated from the slow speed. Therefore, the operator can modulate the speed of the pipette 10 by pulling and releasing the trigger 230. When the entire volume V1 has been dispensed, the pipette 10 beeps, turns off the "dispense" annunciator, and waits for the operator to release the trigger 230 and pull the trigger again. At this point the pipette 10 proceeds through the blowout cycle described above.

Figure 11:
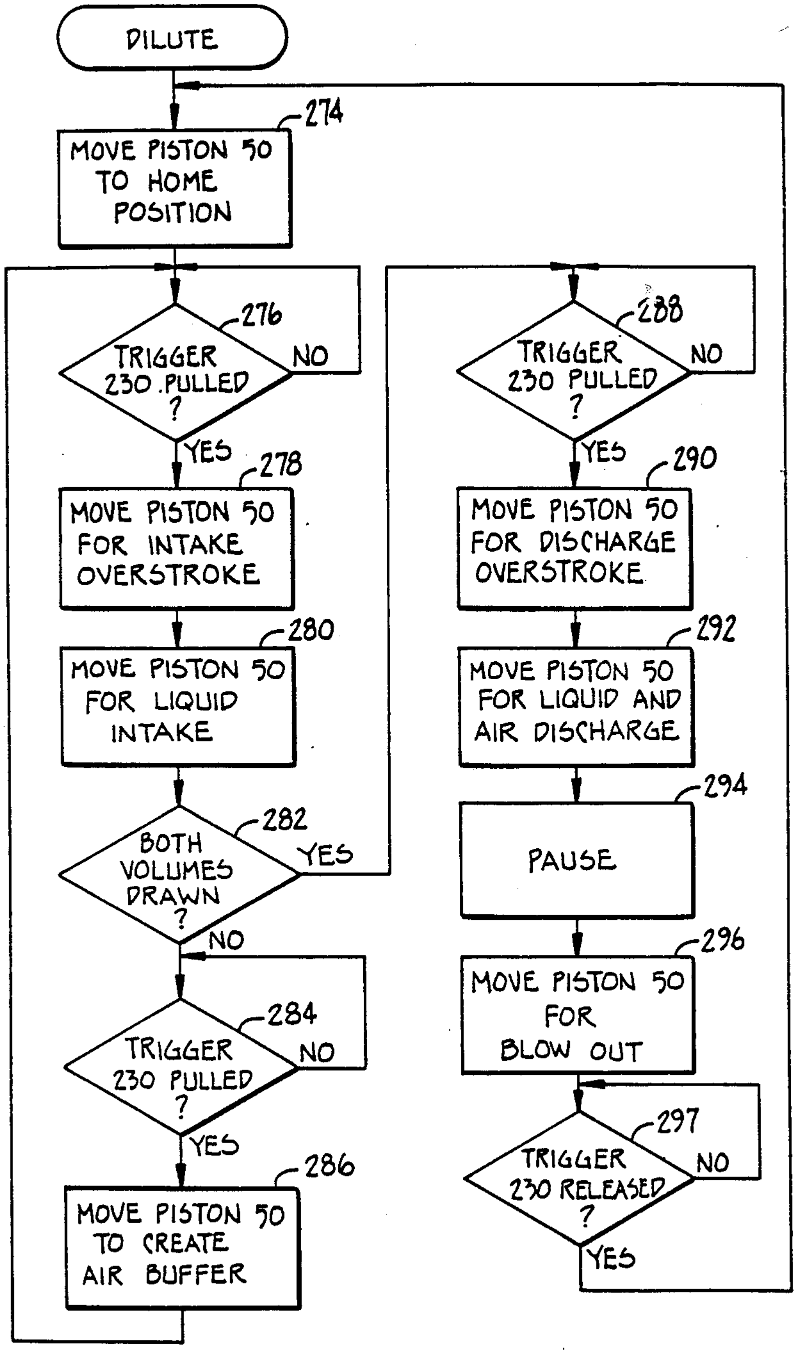
FIG. 11 illustrates a method for diluting in accordance with the invention.

In accordance with the invention, a dilute mode is also provided as shown in FIG. 11. When the operator enters the sequence "F,4", the pipette 10 enters the dilute mode, indicated by the "D" annunciator. The two pickup volumes V1 and V2 (solvent and diluent) can be entered by means of the keyboard 255 as described above. According to this aspect of the invention, upon pulling the trigger 230, indicated by the numeral 276, the first of two programmed volumes V1 of liquid is taken into the displacement chamber 26 and tip 22 of the pipette 10, indicated by the numerals 278 and 280. Upon withdrawal of the tip 22 from the liquid and pulling the trigger 230, an air gap is then placed within the tip 22, indicated by the numerals 282, 284, and 286. Then, the tip 22 is immersed in the second liquid to be taken in, the trigger 230 is pulled a third time, and the second liquid is taken in, indicated by the numerals 276, 278, and 280, respectively. The liquids, separated by the air buffer are then transported to a discharge location. In response to pulling the trigger 230, indicated by the numeral 288, the entire contents of the pipette 10 are dispensed, indicated by the numerals 290 and 292. Upon discharge, both liquids are mixed. Blowout as described above then occurs, indicated by the numerals 294, 296, and 297.

Considered in more detail, initially the pipette 10 displays the first volume V1, and the "pickup" and "V1" annunciators are on, indicating that the instrument is ready to pick up the first volume. When the trigger 230 is pulled, the piston 50 moves up the appropriate distance, beeps, turns off the "V1" annunciator, and displays the message "Air", indicating that the instrument is ready for the air gap. When the trigger 230 is pulled, the piston 50 moves up the appropriate distance for the air bubble, beeps, turns on the "V2" annunciator, and displays the second volume V2. When the trigger 230 is pulled this time, the pipette 10 picks up the second volume V2, beeps, turns off the "pickup" and "V2" annunciators, turns on the "dispense" annunciator, and displays the total volume (volume V1 plus volume V2). When the trigger 230 is pulled again, the pipette 10 proceeds through the dispense and blowout cycles described above.

In accordance with the invention, a measuring mode is also contemplated. According to this aspect of the invention, liquid is picked up in a gradually accelerating manner. Display of the total accumulated volume of liquid is provided for readout in the LCD 260. Upon release and repull of the trigger 230, the acceleration recommences, and the readout continues to accelerate. Rapid and accurate measurement is provided.

An advantage of the pipette in accordance with the invention is the ease of training personnel. In the case of a person who has used a pipette previously, all of the disclosed pipette operation is readily translatable from prior skills. However, inaccuracies which result from the location of soft spring stops in known mechanically operated pipettes are completely avoided. Instead, the precisely driven digital linear actuator of the pipette in accordance with the invention obviates the need for tactile sensing of stops.

A further advantage of the pipette in accordance with the invention is teaching unskilled personnel to use the instrument. All stroking of the pipette in accordance with the invention can be conveniently commanded from a calculator like keyboard. Modes can be individually selected. Moreover, movement is in discrete increments with continuous visual readout through a liquid crystal display. Suitable acoustical prompts are provided through a piezoelectric device. Consequently, rapid learning in the use of the pipette in accordance with the invention results.

An additional advantage of the pipette in accordance with the invention is that with the removal of all mechanical movement from the operator, full concentration can be devoted to pipetting rhythm. It has been found that the rhythmic movement of a pipette from locations where liquid is taken into the pipette to locations where liquid is dispensed from the pipette assures a higher degree of accuracy. In short, by being aware of pipette transport from place to place in the laboratory, higher accuracies in pipetting and titrating can be achieved.

Although the invention has been described and illustrated in detail, it is to be clearly understood that the same is by way of illustration and example only and is not to be taken by way of limitation. Although the motor which operates the linear actuator is a stepper motor in the illustrated embodiments, one modification is to substitute a closed-loop servomotor for the stepper motor. Other modifications which are within the spirit of this invention will appear to persons skilled in the art. Consequently, the true scope of this invention is ascertainable only by reference to the appended claims.

What is claimed is:

1. An automated pipette, comprising:

a pipette drive means, including:
- a motor;
- an integral control circuit for supplying power to the motor; and
- a shaft having a connection to the motor to move in precise lengthwise increments in response to power being supplied to the motor; and a displacement assembly, including:
- a displacement cylinder having first latching means;
- a displacing piston within the cylinder;
- means for communicating linear translation of the shaft to the piston when the displacement assembly is mounted to the pipette drive means;
- a displacement chamber within the cylinder having a first end in communication with the piston and having a second end with an aperture for receiving liquid to be pipetted; and
- means for retaining the piston within the cylinder and having second latching means;

the first and second latching means being interfitted so that the cylinder, piston, and retaining means are interlocked in an assembly both when the displacement assembly is mounted to the pipette drive means and when the displacement assembly is separated from the pipette drive means.

2. The pipette of claim 1 wherein the displacement assembly is removably attachable to the pipette drive means.

3. The pipette of claim 2 wherein the displacement assembly comprises:

a displacement cylinder having a predetermined size correlated to a selected volumne range; and a displacing piston within the cylinder having a predetermined size corresponding to the selected volume range;

the first and second latching means being interfitted so that the cylinder, piston, and retaining means are interlocked in an assembly for interchangeable removable attachment to the drive means.

4. The pipette of claim 2, further comprising encoder means connectable to the pipette drive means for scaling the movement of the shaft depending upon the volume of the attached displacement assembly.

5. The pipette of claim 1, further comprising:

a pipetting tip removably attachable to the second end of the displacement chamber; and ejector means actuable for dislodging the tip.

6. The pipette of claim 1 wherein there is a predetermined air buffer between the displacing piston and the liquid.

7. The pipette of claim 1 wherein the motor and control circuit are battery powered.

8. The pipette of claim 1, further comprising an integral display connected to the control circuit for providing a readout of the volume of liquid which is pipetted.

9. The pipette of claim 1 wherein the pipette is portable, and further comprising an integral keyboard connected to the control circuit for controlling the operation of the pipette.

10. The pipette of claim 9 wherein the keyboard is actuable for selecting from among at least two modes of operation.

11. A pipetting displacement assembly for use with and removably attachable to a linear actuator drive for effecting programmed movement of an actuator shaft, comprising:

a displacing piston having first piston end for contact with the actuator shaft and a second piston end;

biasing means for biasing the first piston end into continuous contact with the shaft:

a displacement cylinder for receiving the second end of the piston;

sealing means between the cylinder and the piston for permitting the piston to penetrate the cylinder; and means for locking the piston, biasing means, and cylinder together in an assembly both when the pipetting displacement assembly is attached to the linear actuator drive and when the pipetting displacement assembly is separated from the linear actuator drive.

12. In a portable pipette having a motor and, responsive thereto, a linear actuator having an actuator shaft in engagement with the motor connectable to a pipetting displacement assembly including a displacing piston penetrating a displacement cylinder for receiving and discharging pipetted liquid, the improvement comprising in combination:

means interconnecting the displacing piston and the linear actuator for removably attaching the motor to the displacement assembly; and encoder means selectively removably attachable to the linear actuator, the encoder means corresopnding to the volume of the displacement assembly for automatically scaling the movement of the linear actuator in proportion to the size of the displacement assembly without energizing the motor.

13. A pipette control circuit means, comprising:

first and second power supply terminals;

a control circuit having a plurality of switch control signal output terminals at which the control circuit provides control signals having a predetermined frequency and phase relationship to each other; and a plurality of actuator shaft drive elements connected in parallel between the power supply terminals, each drive element including a coil and a diode connected in parallel with each other and in series with a recirculation control switch means responsive to a respective control signal so that when the switch means is opened, current flows between the power supply terminals, and when the switch means is closed, back EMF in the coil induces a current to recirculate through the diode and the coil;

thereby respectively disabling and enabling current recirculation.

14. The circuit means of claim 3, further comprising a second switch means having first and second transfer terminals connected in series between the diodes and one of the supply terminals and having a control terminal, and wherein the control circuit supplies signals to the switch control terminal to which the second switch means responds by opening and closing for respectively opening and closing the recirculation control switch means.

15. The circuit means of claim 14 wherein the control circuit provides a control signal to open the second switch means to disable current recirculation at the end of a voltage envelope in the control signal.

16. The circuit means of claim 13 wherein the drive element coils are windings in a digital linear actuator having an actuator shaft along the axis passing through the center of the coils.

17. The circuit means of claim 16 wherein the control signal voltage envelopes are chopped to limit the average current through the drive element coils to their rated capacity.

18. In a control circuit for use with a battery powered pipette, including a motor having a plurality of coils; a switchable current path through each of the coils for energizing the coils; and a recirculation path through each of the coils to perpetuate the accumulated magnetic flux in an energized coil when the current path is opened; the improvement in the control circuit comprising:

first switch means for selectively closing and opening the current path from a power supply through each of the coils for respectively energizing and de-energizing the coils; and second switch means for selectively opening the recirculation path to collapse the magnetic field within the coil and permit the motor to operate without being held back by magnetic fields from preceding energized coils.

19. The combination of a linear actuator for connection to a pipetting displacement assembly having a displacing piston with a first nonadjustable limit of travel after the maximum intake of liquid and a second nonadjustable limit of travel after the discharge of liquid from the displacement assembly:

a motor for driving the linear actuator; and a control circuit means operatively connected to energize the motor to extend the piston to the second nonadjustable limit of travel causing the piston to be driven toward the second nonadjustable limit of travel and the motor to slip even after the piston travel has been interrupted, and then to retract the piston a predetermined distance.

20. The combination of claim 19 wherein the control circuit means includes encoder means for scaling the displacement of the displacing piston according to the size of the displacement assembly.

21. A method for calibrating a motor driven linear actuator for a pipette having a pipetting displacement assembly including a displacing piston, comprising the steps of:

supplying power to advance the motor to drive the displacing piston to a nonadjustble travel limit and continuing to supply power as the motor slips; and then reversing the direction of the motor to cause the piston to move a predetermined distance away from the nonadjustable travel limit to a home position maintaining a predetermined air volume.

22. The method of claim 21 wherein calibration is in response to initially supplying power to the motor.

23. The method of claim 21 wherein calibration is in response to restoration of power following a power outage.

24. The method of claim 21 wherein calibration is in response to connection of a different displacement assembly and an encoder means corresponding to the full-scale volume range of the different displacement assembly.

* * * * *